United States Patent
Zhang

(10) Patent No.: US 10,813,052 B2
(45) Date of Patent: Oct. 20, 2020

(54) METHOD AND DEVICE IN UE AND BASE STATION USED FOR POWER ADJUSTMENT

(71) Applicant: SHANGHAI LANGBO COMMUNICATION TECHNOLOGY COMPANY LIMITED, Shanghai (CN)

(72) Inventor: Xiaobo Zhang, Shanghai (CN)

(73) Assignee: SHANGHAI LANGBO COMMUNICATION TECHNOLOGY COMPANY LIMITED, Shanghai (CN)

(*) Notice: Subject to any disclaimer, the term of this patent is extended or adjusted under 35 U.S.C. 154(b) by 0 days.

(21) Appl. No.: 16/507,043

(22) Filed: Jul. 10, 2019

(65) Prior Publication Data

US 2019/0335402 A1    Oct. 31, 2019

Related U.S. Application Data

(63) Continuation of application No. PCT/CN2018/071702, filed on Jan. 8, 2018.

(30) Foreign Application Priority Data

Jan. 10, 2017  (CN) .......................... 2017 1 0017344
Jan. 22, 2017  (CN) .......................... 2017 1 0045876

(51) Int. Cl.
*H04B 7/0404*    (2017.01)
*H04B 7/0408*    (2017.01)
(Continued)

(52) U.S. Cl.
CPC .......... *H04W 52/04* (2013.01); *H04B 7/0404* (2013.01); *H04B 7/0408* (2013.01);
(Continued)

(58) Field of Classification Search
CPC ....... H04B 7/02–17; H04B 17/0082–40; H04J 11/0003–0093; H04J 2011/0003–0096;
(Continued)

(56) References Cited

U.S. PATENT DOCUMENTS

2012/0076040 A1    3/2012  Hoshino et al.
2019/0289555 A1*   9/2019  Zhang ................... H04W 52/14
2019/0297581 A1*   9/2019  Zhang ................. H04W 52/143

FOREIGN PATENT DOCUMENTS

CN    102271354 A    12/2011
CN    103781111 A    5/2014
(Continued)

OTHER PUBLICATIONS

ISR received in application No. PCT/CN2018/071702 dated Apr. 4, 2018.
(Continued)

*Primary Examiner* — Timothy J Weidner
(74) *Attorney, Agent, or Firm* — Maschoff Brennan

(57) ABSTRACT

The present disclosure discloses a method and a device used for power adjustment in a User Equipment (UE) and a base station. The UE receives L reference signal groups transmitted by L antenna port sets respectively; receives R first signaling(s) for determining R first offset(s); and then transmits a first radio signal for determining K difference value(s) corresponding to K first reference power value(s) respectively, each of which is linearly correlated to a sum of the R first offset(s). Measurement(s) on K reference signal group(s) is (are) respectively used for determining K first reference power value(s). A transmitting power of the first radio signal is a first power associated with a first reference signal group, which is one of the K reference signal group(s). All of the L antenna port sets are used for one same
(Continued)

serving cell or carrier. The disclosure helps improve power control performance and reduce overhead.

20 Claims, 12 Drawing Sheets

(51) Int. Cl.
| | |
|---|---|
| H04B 7/0413 | (2017.01) |
| H04B 7/0426 | (2017.01) |
| H04B 7/06 | (2006.01) |
| H04B 7/08 | (2006.01) |
| H04L 1/00 | (2006.01) |
| H04L 1/18 | (2006.01) |
| H04W 24/02 | (2009.01) |
| H04W 24/10 | (2009.01) |
| H04W 36/06 | (2009.01) |
| H04W 36/16 | (2009.01) |
| H04W 36/20 | (2009.01) |
| H04W 36/30 | (2009.01) |
| H04W 52/04 | (2009.01) |
| H04W 52/24 | (2009.01) |
| H04W 52/32 | (2009.01) |
| H04W 52/36 | (2009.01) |
| H04W 52/42 | (2009.01) |
| H04W 72/04 | (2009.01) |
| H04W 80/08 | (2009.01) |
| H04W 88/02 | (2009.01) |
| H04W 88/08 | (2009.01) |
| H04W 92/10 | (2009.01) |

(52) U.S. Cl.
CPC ......... *H04B 7/0413* (2013.01); *H04B 7/0426* (2013.01); *H04B 7/0617* (2013.01); *H04B 7/088* (2013.01); *H04L 1/0004* (2013.01); *H04L 1/0026* (2013.01); *H04L 1/1819* (2013.01); *H04L 1/1822* (2013.01); *H04L 1/1864* (2013.01); *H04L 1/1896* (2013.01); *H04W 24/02* (2013.01); *H04W 24/10* (2013.01); *H04W 36/06* (2013.01); *H04W 36/165* (2013.01); *H04W 36/20* (2013.01); *H04W 36/30* (2013.01); *H04W 52/242* (2013.01); *H04W 52/243* (2013.01); *H04W 52/245* (2013.01); *H04W 52/246* (2013.01); *H04W 52/325* (2013.01); *H04W 52/36* (2013.01); *H04W 52/365* (2013.01); *H04W 52/42* (2013.01); *H04W 72/046* (2013.01); *H04W 72/0473* (2013.01); *H04W 80/08* (2013.01); *H04W 88/02* (2013.01); *H04W 88/08* (2013.01); *H04W 92/10* (2013.01)

(58) Field of Classification Search
CPC . H04L 1/0001–0039; H04L 1/12–1896; H04L 5/0001–26; H04W 16/28; H04W 24/02–10; H04W 36/0005–385; H04W 52/02–60; H04W 72/005–14; H04W 80/08; H04W 88/02; H04W 88/04–12; H04W 92/04; H04W 92/10
See application file for complete search history.

(56) References Cited

FOREIGN PATENT DOCUMENTS

| | | |
|---|---|---|
| CN | 103891167 A | 6/2014 |
| CN | 104685915 A | 6/2015 |
| CN | 105357682 A | 2/2016 |

OTHER PUBLICATIONS

CN1st Search Report received in application No. 201710045876.1 dated Mar. 5, 2019.
CN1st Office Action received in application No. 201710045876.1dated Mar. 18, 2019.
CN Notice of Allowance received in application No. 201710045876.1 dated Jun. 5, 2019.

* cited by examiner

METHOD AND DEVICE IN UE AND BASE STATION USED FOR POWER ADJUSTMENT

CROSS-REFERENCE TO RELATED APPLICATION

This application is a continuation of International Application No. PCT/CN2018/071702, filed Jan. 8, 2018, claiming the priority benefit of Chinese Patent Application Serial Number 201710017344.7, filed on Jan. 10, 2017, and Chinese Patent Application Serial Number 201710045876.1, filed on Jan. 22, 2017, the full disclosure of which is incorporated herein by reference.

BACKGROUND

Technical Field

The present disclosure relates to transmission methods and devices supporting power adjustment in wireless communication systems, and in particular to a transmission scheme and a device in a wireless communication system with large numbers of antennas deployed at a base station side.

Related Art

In existing Long Term Evolution (LTE) system, Power Headroom Reporting (PHR) is used by a base station for acquiring differences between a nominal maximum transmitting power of a User Equipment (UE) and an estimated power for transmission on a UL-SCH in an activated serving cell.

Massive Multi-Input Multi-Output (MIMO) becomes a hot topic when studying next generation mobile communications. For the massive MIMO, multiple antennas based on beamforming form a narrow beam which points to a particular direction to improve the quality of communication. Since a beam formed by beamforming of multiple antennas is rather narrow, beams pointing in various directions will go through different transmission paths, which leads to significant distinctions of long-term channel fading of channels experienced by signals using different beamforming vectors. Such distinctions have brought about a new problem to uplink power adjustment and PHR.

SUMMARY

The inventors have discovered through researches that when a base station employs multi-antenna beamforming based on massive MIMO, an uplink transmitting power value is related to a receiving beamforming vector of the base station, and different receiving beamforming vectors need to correspond to different uplink transmitting power values. Further, the plurality of receiving beamforming vectors will require a variety of PHRs so as to enable the base station to optimize scheduling of uplink transmission in accordance with utilized receiving beamforming vectors.

The inventors also discovered through further researches that when different receiving beamforming vectors correspond to different PHRs, uplink power control for the different beamforming vectors can share a same power control process, and various uplink transmitting power values required by each receiving beamforming vector can be reflected by PHR, thus reducing complexity of power control and overhead.

It should be noted that though originally targeted at massive antennas, the present disclosure is also applicable to single-antenna application scenarios.

In view of the above discovery, the present disclosure provides a solution. It should be noted that the embodiments of a UE in the present disclosure and the characteristics in the embodiments may be applied to a base station if no conflict is incurred, and vice versa. The embodiments of the present disclosure and the characteristics in the embodiments may be mutually combined if no conflict is incurred.

The present disclosure discloses a method in a UE for power adjustment, comprising:

receiving L reference signal groups;
receiving R first signaling(s); and
transmitting a first radio signal;

Herein, the L reference signal groups are transmitted by L antenna port sets respectively, the R first signaling(s) is (are) used for determining R first offset(s), the first radio signal comprises a first report, the first report is used for determining K difference value(s), the K difference value(s) respectively corresponds(correspond) to K first reference power value(s); each of the K first reference power value(s) is linearly correlated to a sum of the R first offset(s); measurement(s) on K reference signal group(s) is (are) respectively used for determining the K first reference power value(s), the K reference signal group(s) is (are) a subset of the L reference signal groups; a transmitting power of the first radio signal is a first power; the first power is associated with a first reference signal group; the first reference signal group is one of the K reference signal group(s); the R first offset(s) is (are) used for determining the first power; an antenna port set comprises a positive integer number of antenna port(s); all antenna ports of the L antenna port sets are used for one same serving cell, or all antenna ports of the L antenna port sets are used for one same carrier; the L is a positive integer greater than 1, the K is a positive integer not greater than the L, the R is a positive integer.

In one embodiment, the K difference value(s) is (are) carried by a higher layer signaling respectively.

In one sub-embodiment of the above embodiment, the higher layer signaling is a Media Access Control (MAC) signaling.

In one embodiment, an advantage of the above method is that the K difference values are PHRs respectively corresponding to the K antenna port sets, the PHRs corresponding to different antenna port sets reflect distinctions of channel fading of channels experienced by reference signals from different antenna port sets, which helps the base station to improve scheduling of uplink transmission based on channel fading corresponding to specifically used antenna port sets. Further, the K difference values can be reported via a higher signaling to avoid delay caused by multiple reports (namely, reporting one difference value each time).

In one embodiment, another advantage of the above method is that each of the K first reference power values is linearly correlated to a sum of the R first offsets, so that respectively applying different power control processes to the K first reference power values can be avoided, thus streamlining the uplink power control.

In one embodiment, the K is greater than 1.

In one embodiment, an antenna port is formed by superposing of multiple antennas through antenna virtualization, mapping coefficients of the multiple antennas to the antenna port constitute a beamforming vector. A beamforming vector is generated as a Kronecker product of an analog beamforming vector and a digital beamforming vector.

In one embodiment, the L antenna port sets correspond to L antenna virtualization vectors respectively, the L antenna virtualization vectors are used for respective analog beamforming of the antenna ports in corresponding antenna port sets.

In one embodiment, an advantage of the above method is that a power control applicable to a specific beam is able to provide more accurate PHRs for different beams in one serving cell.

In one embodiment, an antenna port set comprises an antenna port. An antenna virtualization vector for the antenna port set is a beamforming vector for the antenna port.

In one embodiment, numbers of antenna ports comprised in different antenna port sets of the L antenna port sets are equal.

In one embodiment, at least two antenna port sets in the L antenna port sets comprise unequal numbers of antenna ports.

In one embodiment, any given reference signal group in the L reference signal groups comprises a positive integer number of reference signal(s), the reference signal(s) in the given reference signal group respectively corresponds(correspond) to antenna port(s) in a transmitting antenna port set corresponding to the given reference signal group.

In one sub-embodiment of the above embodiment, the given reference signal includes Channel Status Information Reference Signal (CSI-RS).

In one embodiment, the R first signaling(s) is (are) dynamic signaling(s), respectively.

In one embodiment, the R first signaling(s) is (are) dynamic signaling(s) used for Uplink Grant, respectively.

In one embodiment, the R first signaling(s) respectively indicates(indicate) the R first offset(s).

In one embodiment, the R first signaling(s) is (are) respectively transmitted on a downlink physical layer control channel (i.e., a downlink channel that can only be used for bearing a physical layer signaling).

In one sub-embodiment of the above embodiment, the downlink physical layer control channel is a Physical Downlink Control Channel (PDCCH).

In one sub-embodiment of the above embodiment, the downlink physical layer control channel is a short PDCCH (sPDCCH).

In one embodiment, the R first offset(s) is (are) respectively indicated by Transmitter Power Control (PHR).

In one embodiment, the K difference value(s) is (are) Power Headroom respectively.

In one embodiment, a unit of each of the K difference value(s) is dB.

In one embodiment, a unit of each of the K first reference power value(s) is dBm.

In one embodiment, K1 first reference power value(s) is (are) a subset of the K first reference power value(s). Any first reference power value of the K1 first reference power value(s) is linearly correlated to at least one of a first component or a third component. The first component is related to a bandwidth occupied by the first radio signal, the third component is related to a Modulation and Coding Scheme (MCS) of the first radio signal. A linear coefficient between any first reference power value of the K1 first reference power value(s) and the first component is 1, and a linear coefficient between any first reference power value of the K1 first reference power value(s) and the third component is 1. The K1 is a non-negative integer not greater than K.

In one sub-embodiment of the above embodiment, the K1 is equal to 1.

In one sub-embodiment of the above embodiment, the K1 is greater than 1.

In one sub-embodiment of the above embodiment, the K1 is equal to K.

In one sub-embodiment of the above embodiment, the K1 is equal to 0.

In one sub-embodiment of the above embodiment, the first component is $10 \log_{10}(M_{PUSCH,c}(i))$, $M_{PUSCH,c}(i)$ is a bandwidth with a unit of resource block allocated to a Physical Uplink Shared CHannel (PUSCH) in an i-th subframe of a serving cell marked with index c, the first radio signal is transmitted on the serving cell marked with index c. The specific meaning of the $M_{PUSCH,c}(i)$ can be found in TS36.213.

In one sub-embodiment of the above embodiment, the third component is $\Delta_{TF,c}(i)$, the $\Delta_{TF,c}(i)$ is a power offset related to the MCS of the first radio signal in an i-th subframe of a serving cell marked with index c, the first radio signal is transmitted on the serving cell marked with index c. The specific meaning of the $\Delta_{TF,c}(i)$ can be found in TS36.213.

In one sub-embodiment of the above embodiment, the third component is configured by a higher layer signaling.

In one sub-embodiment of the above embodiment, the third component is cell-common.

In one embodiment, any first reference power value of the K first reference power value(s) is linearly correlated to a second component; the second component is related to scheduling type of the first radio signal. A linear coefficient between any first reference power value of the K first reference power value(s) and the second component is 1.

In one sub-embodiment of the above embodiment, the second component is $P_{O\_PUSCH,c}(j)$ the $P_{O\_PUSCH,c}(j)$ is a power offset related to a scheduling type marked with index j in a serving cell marked with index c, the first radio signal is transmitted on the serving cell marked with c. The specific meaning of the $P_{O\_PUSCH,c}(j)$ can be found in TS36.213.

In one sub-embodiment of the above embodiment, the scheduling type includes semi-persistent grant, dynamic scheduled grant and random access response grant.

In one sub-embodiment of the above embodiment, for a first reference power value of the K first reference power values that does not belong to the K1 reference power value(s), the scheduling type is fixed as dynamic scheduled grant.

In one sub-embodiment of the above embodiment, the second component is configured by a higher layer signaling.

In one sub-embodiment of the above embodiment, the second component is cell-common.

In one embodiment, the K first reference power value(s) is (are) linearly correlated to K pathloss value(s) respectively, the K pathloss value(s) are respectively determined by the measurement(s) on the K reference signal group(s).

In one sub-embodiment of the above embodiment, a linear coefficient between any first reference power of the K first reference power value(s) and a corresponding pathloss value is a non-negative real number less than or equal to 1.

In one sub-embodiment of the above embodiment, a linear coefficient between any first reference power of the K first reference power value(s) and a corresponding pathloss value is $\alpha_c(j)$, the $\alpha_c(j)$ is a partial pathloss compensation factor related to a scheduling type marked with index j in a serving cell marked with index c, the first radio signal is transmitted on the serving cell marked with index c. The specific meaning of the $\alpha_c(j)$ can be found in TS36.213. In a reference embodiment of the sub-embodiment, for any first reference power value of the K first reference power values that does not belong to the K1 reference power value(s), the j is fixed as 1.

In one sub-embodiment of the above embodiment, a linear coefficient between any first reference power value of the K first reference power value(s) and a corresponding pathloss value is configurable. In one reference embodiment of the above sub-embodiment, the linear coefficient is configured by a higher layer signaling.

In one sub-embodiment of the above embodiment, there exist coefficients between at least two first reference power values of the K first reference power values and corresponding pathloss values that are different.

In one sub-embodiment of the above embodiment, coefficients between all first reference power values of the K first reference power values and corresponding pathloss values are equal.

In one embodiment, a given reference signal group is one of the K reference signal group(s), the given reference signal group consists of one reference signal, and a pathloss value of the given reference signal group is equal to a difference between a transmitting power of the given reference signal and a Reference Signal Received Power (RSRP) of the given reference signal.

In one embodiment, a given reference signal group is one of the K reference signal group(s), the given reference signal group consists of multiple reference signals, and a pathloss value of the given reference signal group is equal to a difference between an average transmitting power of reference signals in the given reference signal group and an average RSRP of reference signals in the given reference signal group.

In one embodiment, a linear coefficient between each of the K first reference power value(s) and a sum of the R first offset(s) is 1.

In one embodiment, a sum of the R first offset(s) is used for determining $f_c(i)$, the $f_c(i)$ is a state of power control adjustment on a PUSCH of an i-th subframe in a serving cell marked with index c, the first radio signal is transmitted on the serving cell marked with index c. The specific meaning of the $f_c(i)$ can be found in TS36.213.

In one embodiment, a sum of the R first offset(s) is equal to $f_c(i)$.

In one embodiment, the K pathloss value(s) is (are) a subset of L pathloss values, the L pathloss values are respectively determined by measurements on the L reference signal groups. The K pathloss value(s) is (are) the smallest K pathloss value(s) of the L pathloss values.

In one embodiment, the K is configured by a higher layer signaling.

In one embodiment, the K pathloss value(s) is (are) all pathloss value(s) of the L pathloss values of which each pathloss value minus a minimum pathloss value has an absolute value less than a given threshold. The given threshold is configured by a higher layer signaling, the minimum pathloss value is a smallest pathloss value of the L pathloss values.

In one embodiment, a unit of the first power is dBm.

In one embodiment, measurements on all reference signals in the first reference signal group are used for determining the first power.

In one embodiment, a pathloss value of the K pathloss value(s) that corresponds to the first reference signal group is used for determining the first power.

In one embodiment, the first power is $P_{PUSCH,c}(i)$, the $P_{PUSCH,c}(i)$ is a transmitting power on a PUSCH of an i-th subframe in a serving cell marked with index c, the first radio signal is transmitted on the serving cell marked with index c. The specific meaning of the $P_{PUSCH,c}(i)$ can be found in TS36.213.

In one embodiment, the first power is equal to $P_{CMAX,c}(i)$ the $P_{CMAX,c}(i)$ is an upper bound of transmitting power configured to the UE in an i-th subframe in a serving cell marked with index c, the first radio signal is transmitted on the serving cell marked with index c. The specific meaning of the $P_{CMAX,c}(i)$ can be found in TS36.213.

In one embodiment, the first power is less than $P_{CMAX,c}(i)$.

In one embodiment, the is to power equal to $10 \log_{10}(\hat{P}_{CMAX,c}(i)-\hat{P}_{PUCCH}(i))$, wherein $\hat{P}_{CMAX,c}(i)$ is a linear value of the $P_{CMX,c}(i)$, the $\hat{P}_{PUCCH}(i)$ is a linear value of a transmitting power of the UE on a Physical Uplink Control CHannel (PUCCH) of an i-th subframe in a serving cell marked with index c, the first radio signal is transmitted on the serving cell marked with c. The specific meaning of the $\hat{P}_{CMAX,c}(i)$ and the $\hat{P}_{PUCCH}(i)$ can be found in TS36.213.

In one embodiment, the first power is less than $10 \log_{10}(\hat{P}_{CMAX,c}(i)-\hat{P}_{PUCCH}(i))$.

In one embodiment, the first power is equal to a target first reference power value; the target first reference power value is a first reference power value of the K first reference power value(s) that is determined by a measurement on the first reference signal group.

In one sub-embodiment of the above embodiment, the target first reference power value is a smallest first reference power value of the K1 first reference power values.

In one sub-embodiment of the above embodiment, a difference value of the K difference values that corresponds to the target first reference power value is a largest difference value of difference values corresponding to the K1 first reference power values among the K difference values.

In one embodiment, the first radio signal comprises at least one of uplink data or uplink control information (UCI).

In one embodiment, the first radio signal indicates an index of each reference signal group of the K reference signal group(s) in the L reference signal groups.

In one embodiment, the first radio signal indicates first indication information, the first indication information is applied in the K difference value(s). The first indication information indicates whether a MAC entity has employed power backoff.

In one embodiment, the first radio signal is transmitted on an uplink physical layer data channel.

In one sub-embodiment of the above embodiment, the uplink physical layer data channel is a PUSCH.

In one sub-embodiment of the above embodiment, the uplink physical layer data channel is a short PUSCH (sPUSCH).

Specifically, according to one aspect of the present disclosure, wherein the first report is triggered by a given condition; the given condition comprises at least one of the following:

a change in an average of K pathloss value(s) is greater than a first threshold, a change in a first pathloss value of the K pathloss value(s) is greater than a second threshold, the first pathloss value is a pathloss value with a biggest change among the K pathloss value(s), a change in a second pathloss value of the K pathloss value(s) is greater than a third threshold, the second pathloss value is a pathloss value with a smallest change among the K pathloss value(s), a change in a reference pathloss value is greater than a fourth threshold, the reference pathloss value is linearly correlated to each of the K pathloss value(s) respectively, a first timer completes time counting, the UE receives a target signaling, the target signaling is used for triggering the first report, herein, the K pathloss value(s) is (are) respectively determined by the measurement(s) on the K reference signal group(s);

In one embodiment, an advantage of the above method is that a triggering of the first report is based on changes in part or all of the K pathloss values, or based on the target signaling, therefore, frequent triggering of the first report led by fast changes in a certain pathloss value of the K pathloss values can be avoided, thus preventing possible waste of uplink resources.

In one embodiment, the first threshold is fixed or configured by a higher layer signaling.

In one embodiment, the second threshold is fixed or configured by a higher layer signaling.

In one embodiment, the third threshold is fixed or configured by a higher layer signaling.

In one embodiment, the fourth threshold is fixed or configured by a higher layer signaling.

In one embodiment, dl-PathlossChange, a Radio Resource Control (RRC) signaling, comprises at least one of the first threshold, the second threshold, the third threshold or the fourth threshold.

In one embodiment, the target signaling is a dynamic signaling, or the target signaling is a higher layer signaling.

In one embodiment, the first timer is a prohibitPHR-Timer.

In one embodiment, the first timer is a periodicPHR-Timer.

In one embodiment, the phrase that a change in an average of K pathloss value(s) is greater than a first threshold refers to: within a given time window, a difference between a maximum value of an average of the K pathloss values detected by the UE and a minimum value of an average of the K pathloss values detected by the UE is greater than the first threshold.

In one sub-embodiment of the above embodiment, the given time window is larger than the prohibitPHR-Timer and smaller than the periodicPHR-Timer.

In one sub-embodiment of the above embodiment, the given time window is a time length of the first timer.

In one embodiment, the phrase that "a change in a first pathloss value of the K pathloss value(s) is greater than a second threshold, the first pathloss value is a pathloss value with a biggest change among the K pathloss value(s)" refers to: within a given time window, a difference between a maximum value of the first pathloss value detected by the UE and a minimum value of the first pathloss value detected by the UE is greater than the second threshold.

In one embodiment, the phrase that "a change in a second pathloss value of the K pathloss value(s) is greater than a third threshold, the second pathloss value is a pathloss value with a smallest change among the K pathloss value(s)" refers to: within a given time window, a difference between a maximum value of the second pathloss value detected by the UE and a minimum value of the second pathloss value detected by the UE is greater than the third threshold.

In one embodiment, the phrase that "a change in a reference pathloss value is greater than a fourth threshold, the reference pathloss value is linearly correlated to each of the K pathloss value(s) respectively" refers to: within a given time window, a difference between a maximum value of the reference pathloss value detected by the UE and a minimum value of the reference pathloss value detected by the UE is greater than the fourth threshold.

In one sub-embodiment of the above embodiment, there are at least two pathloss values in the K pathloss values wherein linear coefficients respectively between the two pathloss values and the reference pathloss value are unequal.

In one sub-embodiment of the above embodiment, a linear coefficient between the reference pathloss value and each pathloss value of the K pathloss values is a real number greater than 0, or less than or equal to 1, respectively.

In one embodiment, a given reference signal group is a reference signal group of the K reference signal group(s), the reference signal group consists of one reference signal, a pathloss value corresponding to the given reference signal group is equal to a transmitting power of the given reference signal minus a RSRP of the given reference signal.

In one embodiment, a given reference signal group is a reference signal group of the K reference signal group(s), the reference signal group consists of multiple reference signals, a pathloss value corresponding to the given reference signal group is equal to an average transmitting power of reference signals in the given reference signal group minus an average RSRP of reference signals in the given reference signal group.

In one embodiment, a unit of the first threshold, a unit of the second threshold, a unit of the third threshold and a unit of the fourth threshold are dB, respectively.

Specifically, according to one aspect of the present disclosure, further comprising:

receiving Q second signaling(s);

wherein the Q second signaling(s) is (are) respectively used for determining Q second offset(s), the K difference value(s) corresponds(correspond) to K second reference power value(s) respectively, each of the K second reference power value(s) is linearly correlated to a sum of the Q second offset(s), the measurement(s) on the K reference signal group(s) is (are) respectively used for determining the K second reference power value(s); the Q is a positive integer.

In one embodiment, the Q second signaling(s) is (are) dynamic signaling(s) respectively.

In one embodiment, the Q second signaling(s) is (are) dynamic signaling(s) used for Downlink Grant respectively.

In one embodiment, the Q second signaling(s) respectively indicates(indicate) the Q second offset(s).

In one embodiment, the Q second signaling(s) is (are) transmitted on a downlink physical layer control channel (i.e., a downlink channel that can only be used for bearing a physical layer signaling) respectively.

In one sub-embodiment of the above embodiment, the downlink physical layer control channel is a PDCCH.

In one sub-embodiment of the above embodiment, the downlink physical layer control channel is an sPDCCH.

In one embodiment, the Q second offset(s) is (are) respectively indicated by TPC.

In one embodiment, a unit(s) of the K second reference power value(s) is (are) dBm, respectively.

In one embodiment, K2 second reference power value(s) is (are) a subset of the K second reference power value(s), any second reference power value of the K2 second reference power value(s) is linearly correlated to a fourth component, a fifth component, or a sixth component. The fourth component and the fifth component are related to PUCCH format respectively, and the sixth component is related to a number of antenna ports which can be used by the UE for transmitting PUCCH. Linear coefficients between any second reference power value of the K2 second reference power value(s) and the fourth component, the fifth component and the sixth component are 1, respectively. The K2 is a non-negative integer not greater than K.

In one sub-embodiment of the above embodiment, the K2 is equal to 1.

In one sub-embodiment of the above embodiment, the K2 is greater than 1.

In one sub-embodiment of the above embodiment, the K2 is equal to K.

In one sub-embodiment of the above embodiment, the K2 is equal to 0.

In one sub-embodiment of the above embodiment, the fourth component is $h(n_{CQI}, n_{HARQ}, n_{SR})$, wherein the $h(n_{CQI}, n_{HARQ}, n_{SR})$ is related to PUCCH format, the $n_{CQI}$ is a number of bits of Hybrid Automatic Repeat reQuest-Acknowledgement (HARQ-ACK) in an i-th subframe, the $n_{SR}$ indicates whether the i-th subframe carries Scheduling Request (SR). The specific meaning of the $h(n_{CQI}, n_{HARQ}, n_{SR})$, the $n_{CQI}$, the $n_{HARQ}$ and the $n_{SR}$ can be found in TS36.213.

In one sub-embodiment of the above embodiment, the fifth component is $\Delta_{F\_PUCCH}(F)$, the $\Delta_{F\_PUCCH}(F)$ is a power offset of PUCCH format F relative to PUCCH format 1a. The specific meaning of the $\Delta_{F\_PUCCH}(F)$ can be found in TS36.213.

In one sub-embodiment of the above embodiment, the sixth component is $\Delta_{TxD}(F')$. When the UE is configured by a higher layer signaling to be able to transmit PUCCH on two antenna ports, the $\Delta_{TxD}(F')$ is configured to each PUCCH format F' by a higher signaling; otherwise the $\Delta_{TxD}(F')$ is equal to 0. The specific meaning of the $\Delta_{TxD}(F')$ can be found in TS36.213.

In one sub-embodiment of the above embodiment, the fifth component is configured by a higher layer signaling.

In one sub-embodiment of the above embodiment, the fifth component is cell-common.

In one sub-embodiment of the above embodiment, the sixth component is configured by a higher layer signaling.

In one sub-embodiment of the above embodiment, the sixth component is cell-common.

In one embodiment, the K second reference power value(s) is (are) linearly correlated to a seventh component respectively, the seventh component is a power benchmark for PUCCH. Linear coefficient(s) between the K second reference power value(s) and the seventh component is (are) 1, respectively.

In one sub-embodiment of the above embodiment, the seventh component is $P_{O\_PUCCH}$, the $P_{O\_PUCCH}$ is a power benchmark for PUCCH. The specific meaning of $P_{O\_PUCCH}$ can be found in TS36.213.

In one sub-embodiment of the above embodiment, the seventh component is configured by a higher layer signaling.

In one sub-embodiment of the above embodiment, the seventh component is cell-common.

In one embodiment, the K second reference power value(s) is (are) linearly correlated to the K pathloss value(s) respectively, the K pathloss value(s) are respectively determined by measurement(s) on the K reference signal group(s).

In one sub-embodiment of the above embodiment, linear coefficient(s) between the K second reference power value(s) and corresponding pathloss value(s) is (are) 1, respectively.

In one embodiment, linear coefficient(s) between the K second reference power value(s) and a sum of the Q second offset(s) is (are) 1, respectively.

In one embodiment, a sum of the Q second offset(s) is used for determining g(i), the g(i) is a state of power control adjustment on the present PUCCH. The specific meaning of g(i) can be found in TS36.213.

In one embodiment, a sum of the Q second offset(s) is equal to the g(i).

Specifically, according to one aspect of the present disclosure, wherein a target first signaling is a latest first signaling among the R first signaling(s), the target first signaling comprises scheduling information of the first radio signal, the scheduling information of the first radio signal comprises at least one of time domain resources occupied, frequency domain resources occupied, an MCS, a HARQ process number, a Redundancy Version (RV) or a New Data Indicator (NDI).

In one embodiment, the target first signaling is used for determining an index of the first reference signal group in the K reference signal groups.

In one sub-embodiment of the above embodiment, the target first signaling comprises B bit(s); the B bit(s) indicates (indicate) the index of the first reference signal group in the K reference signal groups, the B is a positive integer.

Specifically, according to one aspect of the present disclosure, wherein the K difference value(s) respectively corresponds(correspond) to K reference power value(s); a given reference power value is any reference power value of the K reference power value(s); the given reference power value is determined by a corresponding first reference power value and a corresponding second reference power value; or the given reference power value is equal to a corresponding first reference power value.

In one embodiment, unit(s) of the K reference power value(s) is (are) dBm, respectively.

In one embodiment, the K reference power value(s) is (are) respectively equal to a logarithm of a sum of a linear value of corresponding first reference power value and a linear value of corresponding reference power value with base 10 further multiplied by 10.

In one embodiment, a linear value of a given power value of equal to an exponential of the given power value divided by 10 with base 10, a unit of the given power value is dBm.

Specifically, according to one aspect of the present disclosure, wherein the K difference value(s) is (are) respectively equal to difference(s) between a first limiting power value and corresponding reference power value(s); or a first difference value is equal to a difference between a second limiting power value and a corresponding reference power value, the first difference value is one of the K difference values, difference value(s) of the K difference values other than the first difference value is (are) respectively equal to difference(s) between a first limiting power value and corresponding reference power value(s); or the K difference value(s) respectively corresponds(correspond) to K target power value(s), the K difference value(s) is (are) respectively equal to difference(s) between corresponding target power value(s) and corresponding reference power value(s).

In one embodiment, units of the first limiting power value, the second limiting power value and the K target power value(s) are dBm, respectively.

In one embodiment, the first limiting power value is a maximum transmitting power of the first radio signal in a serving cell corresponding to the L antenna port sets.

In one embodiment, the first limiting power value is a maximum transmitting power of the first radio signal in a serving cell corresponding to the L antenna port sets, which is calculated according to TS36.101 when Maximum Power Reduction (MPR), Additional Maximum Power Reduction (A-MPR), Power Management Maximum Power Reduction (P-MPR) and Allowed operating band edge transmission power relaxation (ΔTc) are all 0 dB. Herein, the specific meaning of the MPR, the A-MPR, the P-MPR and the ΔTc can be found in TS36.101.

In one embodiment, the first limiting power value is $\tilde{P}_{CMAX,c}(i)$, the $\tilde{P}_{CMAX,c}(i)$ is a maximum transmitting power of the UE in an i-th subframe of a serving cell marked with index c. The L antenna port sets are used for the serving cell marked with index c (namely, transmitting radio signals on the serving cell marked with c). The specific meaning of the $\tilde{P}_{CMAX,c}(i)$ can be found in TS36.213.

In one embodiment, the K difference value(s) is (are) respectively equal to difference(s) between a first limiting power value and corresponding reference power value(s).

In one embodiment, the first limiting power value is indicated by the first radio signal.

In one embodiment, a first difference value is equal to a difference between a second limiting power value and a corresponding reference power value, difference value(s) of the K difference values other than the first difference value is (are) respectively equal to difference(s) between a first limiting power value and corresponding reference power value(s).

In one embodiment, the second limiting power value is $P_{CMAX,c}(i)$, the $P_{CMAX,c}(i)$ a maximum transmitting power of the UE in an i-th subframe of a serving cell marked with index c. The L antenna port sets transmit radio signals on the serving cell marked with c. The specific meaning of the $P_{CMAX,c}(i)$ can be found in TS36.213.

In one embodiment, the K difference value(s) respectively corresponds(correspond) to K target power value(s), the K difference value(s) is (are) respectively equal to difference(s) between corresponding target power value(s) and corresponding reference power value(s).

In one embodiment, an advantage of the above method is that the UE can be allocated a variable maximum transmitting power based on different beams. Compared with existing art, the method helps reduce interference among cells.

In one embodiment, the K target power value(s) is (are) respectively indicated by the first radio signal.

In one embodiment, the K target power value(s) is (are) respectively configured by a downlink signaling.

Specifically, according to one aspect of the present disclosure, further comprising:
    receiving a first downlink signaling; and
    receiving a second downlink signaling;
    herein, the first downlink signaling indicates a time length of the first timer, the second downlink signaling is used for determining at least one of the first threshold, the second threshold, the third threshold or the fourth threshold.

In one embodiment, the first downlink signaling is an RRC layer signaling.

In one embodiment, the first downlink signaling is common to a serving cell.

In one embodiment, the first downlink signaling is a periodicPHR-Timer field in MAC-MainConfig Information Element (IE), the first timer is a periodicPHR-Timer.

In the above embodiment, termination of the periodicPHR-Timer triggers K PHRs for a serving cell rather than triggering only one PHR for a serving cell as in traditional schemes.

In one embodiment, the first downlink signaling is a prohibitPHR-Timer field in MAC-MainConfig Information Element (IE), the first timer is a prohibitPHR-Timer.

In one embodiment, the second downlink signaling is a higher layer signaling.

In one embodiment, the second downlink signaling is a dl-PathlossChange field in MAC-MainConfig IE.

In one embodiment, the second downlink signaling is common to a serving cell.

The present disclosure discloses a method in a base station for power adjustment, comprising:
    transmitting L reference signal groups;
    transmitting R first signaling(s); and
    receiving a first radio signal;
    wherein the L reference signal groups are transmitted by L antenna port sets respectively, the R first signaling(s) is (are) used for determining R first offset(s), the first radio signal comprises a first report, the first report is used for determining K difference value(s), the K difference value(s) respectively corresponds(correspond) to K first reference power value(s); each of the K first reference power value(s) is linearly correlated to a sum of the R first offset(s); measurement(s) on K reference signal group(s) is (are) respectively used for determining the K first reference power value(s), the K reference signal group(s) is (are) a subset of the L reference signal groups; a transmitting power of the first radio signal is a first power; the first power is associated with a first reference signal group; the first reference signal group is one of the K reference signal group(s); the R first offset(s) is (are) used for determining the first power; an antenna port set comprises a positive integer number of antenna port(s); all antenna ports of the L antenna port sets are used for one same serving cell, or all antenna ports of the L antenna port sets are used for one same carrier; the L is a positive integer greater than 1, the K is a positive integer not greater than the L, the R is a positive integer.

In one embodiment, the R first offset(s) is (are) respectively indicated by Transmitter Power Control (TPC).

In one embodiment, the first report comprises Power Headroom Report (PHR).

In one embodiment, the K difference value(s) is (are) Power Headroom (PH) respectively.

In one embodiment, the K first reference power value(s) is (are) linearly correlated to K pathloss value(s) respectively, the K pathloss value(s) is (are) respectively determined by measurement(s) on the K reference signal group(s) respectively.

In one embodiment, a pathloss value of the K pathloss value(s) that corresponds to the first reference signal group is used for determining the first power.

In one embodiment, the first radio signal comprises at least one of uplink data or UCI.

Specifically, according to one aspect of the disclosure, wherein the first report is triggered by a given condition; the given condition comprises at least one of the following:
    a change in an average of K pathloss value(s) is greater than a first threshold,
    a change in a first pathloss value of the K pathloss value(s) is greater than a second threshold, the first pathloss value is a pathloss value with a biggest change among the K pathloss value(s),
    a change in a second pathloss value of the K pathloss value(s) is greater than a third threshold, the second pathloss value is a pathloss value with a smallest change among the K pathloss value(s),
    a change in a reference pathloss value is greater than a fourth threshold, the reference pathloss value is linearly correlated to each of the K pathloss value(s) respectively,
    a first timer completes time counting,
    the UE receives a target signaling, the target signaling is used for triggering the first report;

herein, the K pathloss value(s) is (are) respectively determined by measurement(s) on the K reference signal group(s).

Specifically, according to one aspect of the present disclosure, further comprising:

transmitting Q second signaling(s);

wherein the Q second signaling(s) is (are) respectively used for determining Q second offset(s), the K difference value(s) corresponds(correspond) to K second reference power value(s) respectively, each of the K second reference power value(s) is linearly correlated to a sum of the Q second offset(s), the measurement(s) on the K reference signal group(s) is (are) respectively used for determining the K second reference power value(s); the Q is a positive integer.

In one embodiment, the Q second offset(s) is (are) respectively indicated by TPC.

Specifically, according to one aspect of the present disclosure, wherein a target first signaling is a latest first signaling among the R first signaling(s), the target first signaling comprises scheduling information of the first radio signal, the scheduling information of the first radio signal comprises at least one of time domain resources occupied, frequency domain resources occupied, an MCS, a HARQ process number, an RV or an NDI.

Specifically, according to one aspect of the present disclosure, wherein the K difference value(s) corresponds(correspond) to K reference power value(s) respectively, a given reference power value is any reference power value of the K reference power value(s); the given reference power value is determined by a corresponding first reference power value and a corresponding second reference power value; or the given reference power value is equal to a corresponding first reference power value.

Specifically, according to one aspect of the present disclosure, wherein the K difference value(s) is (are) respectively equal to difference(s) between a first limiting power value and corresponding reference power value(s); or a first difference value is equal to a difference between a second limiting power value and a corresponding reference power value, the first difference value is one of the K difference values, difference value(s) of the K difference values other than the first difference value is (are) respectively equal to difference(s) between a first limiting power value and corresponding reference power value(s); or the K difference value(s) respectively corresponds(correspond) to K target power value(s), the K difference value(s) is (are) respectively equal to difference(s) between corresponding target power value(s) and corresponding reference power value(s).

Specifically, according to one aspect of the present disclosure, further comprising:

transmitting a first downlink signaling; and transmitting a second downlink signaling;

wherein the first downlink signaling indicates a time length of the first timer, the second downlink signaling is used for determining at least one of the first threshold, the second threshold, the third threshold or the fourth threshold.

The present disclosure discloses a UE for power adjustment, comprising:

a first receiver, receiving L reference signal groups;

a second receiver, receiving R first signaling(s); and a first transmitter, transmitting a first radio signal;

herein, the L reference signal groups are transmitted by L antenna port sets respectively, the R first signaling(s) is (are) used for determining R first offset(s), the first radio signal comprises a first report, the first report is used for determining K difference value(s), the K difference value(s) respectively corresponds(correspond) to K first reference power value(s); each of the K first reference power value(s) is linearly correlated to a sum of the R first offset(s); measurement(s) on K reference signal group(s) is (are) respectively used for determining the K first reference power value(s), the K reference signal group(s) is (are) a subset of the L reference signal groups; a transmitting power of the first radio signal is a first power; the first power is associated with a first reference signal group; the first reference signal group is one of the K reference signal group(s); the R first offset(s) is (are) used for determining the first power; an antenna port set comprises a positive integer number of antenna port(s); all antenna ports of the L antenna port sets are used for one same serving cell, or all antenna ports of the L antenna port sets are used for one same carrier; the L is a positive integer greater than 1, the K is a positive integer not greater than the L, the R is a positive integer.

In one embodiment, the above UE for power adjustment is characterized in that the first report is triggered by a given condition; the given condition comprises at least one of the following:

a change in an average of K pathloss value(s) is greater than a first threshold, a change in a first pathloss value of the K pathloss value(s) is greater than a second threshold, the first pathloss value is a pathloss value with a biggest change among the K pathloss value(s), a change in a second pathloss value of the K pathloss value(s) is greater than a third threshold, the second pathloss value is a pathloss value with a smallest change among the K pathloss value(s), a change in a reference pathloss value is greater than a fourth threshold, the reference pathloss value is linearly correlated to each of the K pathloss value(s) respectively, a first timer completes time counting, the UE receives a target signaling, the target signaling is used for triggering the first report;

herein, the K pathloss value(s) is (are) respectively determined by measurement(s) on the K reference signal group(s).

In one embodiment, the above UE for power adjustment is characterized in that the second receiver also receives Q second signaling(s). Herein, the Q second signaling(s) is (are) respectively used for determining Q second offset(s), the K difference value(s) corresponds(correspond) to K second reference power value(s) respectively, each of the K second reference power value(s) is linearly correlated to a sum of the Q second offset(s), the measurement(s) on the K reference signal group(s) is (are) respectively used for determining the K second reference power value(s); the Q is a positive integer.

In one embodiment, the above UE for power adjustment is characterized in that a target first signaling is a latest first signaling among the R first signaling(s), the target first signaling comprises scheduling information of the first radio signal, the scheduling information of the first radio signal comprises at least one of time domain resources occupied, frequency domain resources occupied, an MCS, a HARQ process number, an RV or an NDI.

In one embodiment, the above UE for power adjustment is characterized in that the K difference value(s) corresponds (correspond) to K reference power value(s) respectively, a given reference power value is any reference power value of the K reference power value(s); the given reference power value is determined by a corresponding first reference power value and a corresponding second reference power value; or the given reference power value is equal to a corresponding first reference power value.

In one embodiment, the above UE for power adjustment is characterized in that the K difference value(s) is (are) respectively equal to difference(s) between a first limiting power value and corresponding reference power value(s); or a first difference value is equal to a difference between a second limiting power value and a corresponding reference power value, the first difference value is one of the K difference values, difference value(s) of the K difference values other than the first difference value is (are) respectively equal to difference(s) between a first limiting power value and corresponding reference power value(s); or the K difference value(s) respectively corresponds(correspond) to K target power value(s), the K difference value(s) is (are) respectively equal to difference(s) between corresponding target power value(s) and corresponding reference power value(s).

In one embodiment, the above UE for power adjustment is characterized in that the first receiver also receives a first downlink signaling and a second downlink signaling. Herein, the first downlink signaling indicates a time length of the first timer, the second downlink signaling is used for determining at least one of the first threshold, the second threshold, the third threshold or the fourth threshold.

The present disclosure discloses a base station for power adjustment, comprising:

a second transmitter, transmitting L reference signal groups;

a third transmitter, transmitting R first signaling(s); and a third receiver, receiving a first radio signal;

wherein the L reference signal groups are transmitted by L antenna port sets respectively, the R first signaling(s) is (are) used for determining R first offset(s), the first radio signal comprises a first report, the first report is used for determining K difference value(s), the K difference value(s) respectively corresponds(correspond) to K first reference power value(s); each of the K first reference power value(s) is linearly correlated to a sum of the R first offset(s); measurement(s) on K reference signal group(s) is (are) respectively used for determining the K first reference power value(s), the K reference signal group(s) is (are) a subset of the L reference signal groups; a transmitting power of the first radio signal is a first power; the first power is associated with a first reference signal group; the first reference signal group is one of the K reference signal group(s); the R first offset(s) is (are) used for determining the first power; an antenna port set comprises a positive integer number of antenna port(s); all antenna ports of the L antenna port sets are used for one same serving cell, or all antenna ports of the L antenna port sets are used for one same carrier; the L is a positive integer greater than 1, the K is a positive integer not greater than the L, the R is a positive integer.

In one embodiment, the above base station for power adjustment is characterized in that the first report is triggered by a given condition; the given condition comprises at least one of the following:

a change in an average of K pathloss value(s) is greater than a first threshold, a change in a first pathloss value of the K pathloss value(s) is greater than a second threshold, the first pathloss value is a pathloss value with a biggest change among the K pathloss value(s), a change in a second pathloss value of the K pathloss value(s) is greater than a third threshold, the second pathloss value is a pathloss value with a smallest change among the K pathloss value(s), a change in a reference pathloss value is greater than a fourth threshold, the reference pathloss value is linearly correlated to each of the K pathloss value(s) respectively, a first timer completes time counting, the UE receives a target signaling, the target signaling is used for triggering the first report;

herein, the K pathloss value(s) is (are) respectively determined by measurement(s) on the K reference signal group(s).

In one embodiment, the above base station for power adjustment is characterized in that the third transmitter also transmits Q second signaling(s). Herein, the Q second signaling(s) is (are) respectively used for determining Q second offset(s), the K difference value(s) corresponds(correspond) to K second reference power value(s) respectively, each of the K second reference power value(s) is linearly correlated to a sum of the Q second offset(s), the measurement(s) on the K reference signal group(s) is (are) respectively used for determining the K second reference power value(s); the Q is a positive integer.

In one embodiment, the above base station for power adjustment is characterized in that a target first signaling is a latest first signaling among the R first signaling(s), the target first signaling comprises scheduling information of the first radio signal, the scheduling information of the first radio signal comprises at least one of time domain resources occupied, frequency domain resources occupied, an MCS, a HARQ process number, an RV or an NDI.

In one embodiment, the above base station for power adjustment is characterized in that the K difference value(s) corresponds(correspond) to K reference power value(s) respectively, a given reference power value is any reference power value of the K reference power value(s); the given reference power value is determined by a corresponding first reference power value and a corresponding second reference power value; or the given reference power value is equal to a corresponding first reference power value.

In one embodiment, the above base station for power adjustment is characterized in that the K difference value(s) is (are) respectively equal to difference(s) between a first limiting power value and corresponding reference power value(s); or a first difference value is equal to a difference between a second limiting power value and a corresponding reference power value, the first difference value is one of the K difference values, difference value(s) of the K difference values other than the first difference value is (are) respectively equal to difference(s) between a first limiting power value and corresponding reference power value(s); or the K difference value(s) respectively corresponds(correspond) to K target power value(s), the K difference value(s) is (are) respectively equal to difference(s) between corresponding target power value(s) and corresponding reference power value(s).

In one embodiment, the above base station for power adjustment is characterized in that the second transmitter also transmits a first downlink signaling and a second downlink signaling. Herein, the first downlink signaling indicates a time length of the first timer, the second downlink signaling is used for determining at least one of the first threshold, the second threshold, the third threshold or the fourth threshold.

In one embodiment, the present disclosure has the following advantages over conventional schemes:

For a serving cell, multiple mutually independent PH reporting processes can be supported simultaneously.

Different PH reporting processes can be performed targeting reception beamforming vectors and transmission beamforming vectors. Due to large distinctions of channel long-term fading when different reception beamforming vectors and transmission beamforming vectors are utilized, each PH reporting process can adjust PH according to the actual channel statistical characteristics, therefore, the base station will be more suitable to the channel characteristics actually experienced by uplink transmission in optimization of uplink scheduling.

Uplink transmitting power values corresponding to different reception beamforming vectors and transmission beamforming vectors are reflected through multiple PHRs, so that uplink transmissions corresponding to different reception beamforming vectors and transmission beamforming vectors can share a same uplink power control process, thus reducing complexity of uplink power control and signaling overhead.

The triggering of PH reporting is based on part of or all changes in channel long-term fading of different reception beamforming vectors and transmission beamforming vectors, or is based on signaling of the base station, thereby avoiding frequent triggering of the first report led by fast changes in long-term fading of a certain channel, and further, avoiding wastes of uplink resources.

BRIEF DESCRIPTION OF THE DRAWINGS

Other features, objects and advantages of the present disclosure will become more apparent from the detailed description of non-restrictive embodiments taken in conjunction with the following drawings.

DESCRIPTION OF THE EMBODIMENTS

Embodiment 1

Figure 1:
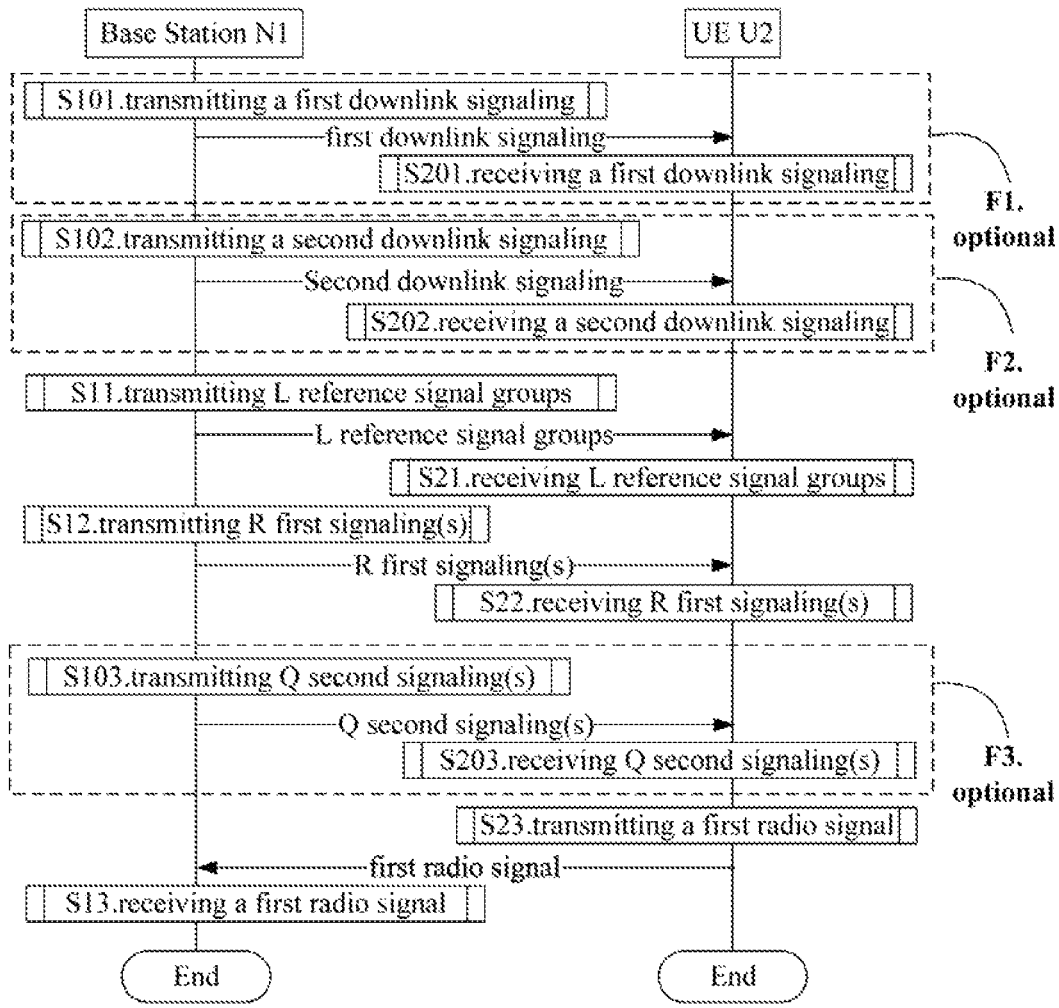
FIG. 1 illustrates a flowchart of wireless transmission according to one embodiment of the present disclosure.

Embodiment 1 illustrates a flowchart of wireless transmission, as shown in FIG. 1. In FIG. 1, a base station N1 is a maintenance base station for a serving cell of a UE U2. In FIG. 1, steps in box F1, box F2 and box F3 are optional, respectively.

The base station N1 transmits a first downlink signaling in step S101; transmits a second downlink signaling in step S102; transmits L reference signal groups in S11; transmits R first signaling(s) in S12; transmits Q second signaling(s) in step S103; and receives a first radio signal in step S13.

The UE U2 receives a first downlink signaling in step S201; receives a second downlink signaling in step S202; receives L reference signal groups in step S21; receives R first signaling(s) in step S22; receives Q second signaling(s) in step S203; and transmits a first radio signal in step S23.

In Embodiment 1, the L reference signal groups are transmitted by L antenna port sets respectively, the R first signaling(s) is (are) respectively used by the U2 for determining R first offset(s), the first radio signal comprises a first report, the first report is used by the U2 for determining K difference value(s), the K difference value(s) respectively corresponds(correspond) to K first reference value(s). Each of the K first reference power value(s) is linearly correlated to a sum of the R first offset(s). Measurement(s) on K reference signal group(s) is (are) respectively used by the U2 for determining the K first reference power value(s), the K reference signal group(s) is (are) a subset of the L reference signal groups. A transmitting power of the first radio signal is a first power, the first power is associated to a first reference signal group, the first reference signal group is one of the K reference signal group(s). The R first offset(s) is (are) used by the U2 for determining the first power. An antenna port set comprises a positive integer number of antenna port(s). All antenna ports in the L antenna port sets are used for one same carrier. The L is a positive integer greater than 1, the K is a positive integer not greater than the L, the R is a positive integer. The Q second signaling(s) is (are) respectively used by the U2 for determining Q second offset(s), the K difference value(s) respectively corresponds (correspond) to K second reference power value(s), each of the K second reference power value(s) is linearly correlated to a sum of the Q second offset(s), measurement(s) on the K reference signal group(s) is (are) respectively used by the U2 for determining the K second reference power value(s). The Q is a positive integer. The first report is triggered by a given condition, the first downlink signaling and the second downlink signaling are used by the U2 for determining the given condition.

In one embodiment, the K difference value(s) is (are) carried by a higher layer signaling, respectively.

In one sub-embodiment of the above embodiment, the higher layer signaling is a MAC layer signaling.

In one embodiment, the K is greater than 1.

In one embodiment, an antenna port is formed by superposing multiple antennas through antenna virtualization, mapping coefficients of the multiple antennas to the antenna port constitute a beamforming vector. A beamforming vector is generated as a Kronecker product of an analog beamforming vector and a digital beamforming vector.

In one embodiment, the L antenna port sets correspond to L antenna virtualization vectors respectively, the L antenna virtualization vectors are respectively used for analog beamforming of antenna ports in corresponding antenna port sets.

In one embodiment, an antenna port set comprises an antenna port. An antenna virtualization vector for the antenna port set is a beamforming vector for the antenna port.

In one embodiment, numbers of antenna ports comprised in different antenna port sets of the L antenna port sets are equal.

In one embodiment, at least two antenna port sets in the L antenna port sets comprise unequal numbers of antenna ports.

In one embodiment, any given reference signal group in the L reference signal groups comprises a positive integer number of reference signal(s), the reference signal(s) in the given reference signal group respectively corresponds(correspond) to antenna port(s) in a transmitting antenna port set corresponding to the given reference signal group.

In one sub-embodiment of the above embodiment, the given reference signal includes CSI-RS.

In one embodiment, the R first signaling(s) is (are) dynamic signaling(s), respectively.

In one embodiment, the R first signaling(s) is (are) dynamic signaling(s) used for Uplink Grant, respectively.

In one embodiment, the R first signaling(s) respectively indicates(indicate) the R first offset(s).

In one embodiment, the R first offset(s) is (are) respectively indicated by TPC.

In one embodiment, the first report comprises PHR.

In one embodiment, the K difference value(s) is (are) PH, respectively.

In one embodiment, the given condition comprises at least one of the following:

a change in an average of K pathloss value(s) is greater than a first threshold, a change in a first pathloss value of the K pathloss value(s) is greater than a second threshold, the first pathloss value is a pathloss value with a biggest change among the K pathloss value(s), a change in a second pathloss value of the K pathloss value(s) is greater than a third threshold, the second pathloss value is a pathloss value with a smallest change among the K pathloss value(s), a change in a reference pathloss value is greater than a fourth threshold, the reference pathloss value is linearly correlated to each of the K pathloss value(s) respectively, a first timer completes time counting, the UE receives a target signaling, the target signaling is used for triggering the first report;

herein, the K pathloss value(s) is (are) respectively determined by measurement(s) on the K reference signal group(s).

In one embodiment, a given reference signal group is one of the K reference signal group(s), the given reference signal group consists of multiple reference signals, and a pathloss value of the given reference signal group is equal to a difference between an average transmitting power of reference signals in the given reference signal group and an average RSRP of reference signals in the given reference signal group.

In one embodiment, the K pathloss value(s) is (are) a subset of L pathloss values, the L pathloss values are respectively determined by measurements on the L reference signal groups. The K pathloss value(s) is (are) the smallest K pathloss value(s) of the L pathloss values.

In one embodiment, the K is configured by a higher layer signaling.

In one embodiment, the K pathloss value(s) is (are) all pathloss value(s) of the L pathloss values of which each pathloss value minus a minimum pathloss value has an absolute value less than a given threshold. The given threshold is configured by a higher layer signaling, the minimum pathloss value is a smallest pathloss value of the L pathloss values.

In one embodiment, the first downlink signaling indicates a time length of the first timer, the second downlink signaling is used for determining at least one of the first threshold, the second threshold, the third threshold or the fourth threshold.

In one embodiment, the first downlink signaling is a periodicPHR-Timer field in MAC-MainConfig IE, the first timer is a periodicPHR-Timer.

In one embodiment, the first downlink signaling is a prohibitPHR-Timer field in MAC-MainConfig IE, the first timer is a prohibitPHR-Timer.

In one embodiment, the second downlink signaling is a dl-PathlossChange field in MAC-MainConfig IE.

In one embodiment, there are at least two pathloss values in the K pathloss values wherein linear coefficients respectively between the two pathloss values and the reference pathloss value are unequal.

In one embodiment, the reference pathloss value a linear coefficient between the reference pathloss value and each pathloss value of the K pathloss values is a real number greater than 0, or less than or equal to 1, respectively.

In one embodiment, the Q second signaling(s) is (are) respectively dynamic signaling(s) used for Downlink Grant.

In one embodiment, the Q second offset(s) is (are) respectively indicated by TPC.

In one embodiment, K1 first reference power value(s) is (are) linearly correlated to a first component, a second component, a third component, an eighth component and a ninth component, respectively. A linear coefficient between any first reference power value of the K1 first reference power value(s) and one of the first component, the second component, the third component and the ninth component is 1, respectively. A linear coefficient between any first reference power value of the K1 first reference power value(s) and the eighth component is a non-negative real number less than or equal to 1. The K1 first reference power value(s) is (are) a subset of the K first reference power values, the K1 is a non-negative integer not greater than K. First reference power value(s) of the K first reference power values not belonging to the K1 first reference power value(s) is (are) linearly correlated to the second component, the eighth component and the ninth component, respectively. A linear coefficient between any first reference power value of the K first reference power values not belonging to the K1 first reference power value(s) and one of the second component and the ninth component is 1, respectively; A linear coefficient between any first reference power value of the K first reference power values not belonging to the K1 first reference power value(s) and the eighth component is a non-negative real number less than or equal to 1. The formula is described as below:

$$P_{ref1}(k) = \begin{cases} 10\log_{10}(M_{PUSCH,c}(i)) + P_{O\_PUSCH,c}(j) + \\ \quad \alpha_c(j) \cdot PL_c(k) + \Delta_{TF,c}(i) + f_c(i) \\ P_{O\_PUSCH,c}(1) + \alpha_c(1) \cdot PL_c(k) + f_c(i), \end{cases}, \begin{matrix} k = 0 \sim K1-1 \\ \\ k = K1 \sim K-1 \end{matrix}$$

Herein, k, $P_{ref1}(k)$, $10\log_{10}(M_{PUSCH,c}(i))$, $P_{O\_PUSCH,c}(i)$, $\alpha_c(j)$, $PL_c(k)$, $\Delta_{TF,c}(i)$ and $f_c(i)$ respectively refer to an index of a given first reference power value in the K first reference power value(s), a first reference power value marked with index k, the first component, the second component, a linear coefficient between the first reference power value marked with index k and the eighth component, the eighth component, the third component, and the ninth component. The specific meaning of the $M_{PUSCH,c}(i)$, the $P_{O\_PUSCH,c}(j)$, the $\alpha_c(j)$, the $\Delta_{TF,c}(i)$ and the $f_c(i)$ can be found in TS36.213. The $P_{ref1}(k)$ marked with an integer index ranging from 0 to K1-1 belongs to the K1 first reference power value(s); the $P_{ref1}(k)$ marked with an integer index ranging from K1 to K-1 belongs to first reference power value(s) of the K first reference power values not belonging to the K1 first reference power value(s). For any first reference power value of the K first reference power values that does not belong to the K1 first reference power value(s), a parameter j in the $P_{O\_PUSCH,c}(i)$ and the $\alpha_c(j)$ is a constant 1. The $PL_c(k)$ is a pathloss value determined by a measurement on a reference signal group marked with index k among the K reference signal groups.

In one sub-embodiment of the above embodiment, a sum of the R first offset(s) is equal to the $f_c(i)$.

In one sub-embodiment of the above embodiment, the K1 is equal to 1.

In one sub-embodiment of the above embodiment, the K1 is greater than 1.

In one sub-embodiment of the above embodiment, the K1 is equal to K.

In one sub-embodiment of the above embodiment, the K1 is equal to 0.

In one embodiment, K2 second reference value(s) is (are) linearly correlated to a fourth component, a fifth component, a sixth component, a seventh component, an eighth component and a tenth component respectively. A linear coefficient between any second reference value of the K2 second reference value(s) and one of the fourth component, the fifth component, the sixth component, the seventh component, the eighth component and the tenth component is 1, respectively. The K2 second reference power value(s) is (are) a subset of the K second reference power values, the K2 is a non-negative integer not greater than K. Second reference power value(s) of the K second reference power values not belonging to the K2 second reference power value(s) is (are) linearly correlated to the seventh component, the eighth component and the tenth component, respectively. A linear coefficient between any second reference power value of the K second reference power values not belonging to the K2 second reference power value(s) and one of the seventh component, the eighth component and the tenth component is 1, respectively. The formula is described as below:

$$P_{ref2}(k) = \begin{cases} P_{0\_PUCCH} + PL_c(k) + h(n_{CQI}, n_{HARQ}, n_{SR}) + \\ \quad \Delta_{F\_PUCCH}(F) + \Delta_{TxD}(F') + g(i) \\ P_{0\_PUCCH} + PL_c(k) + g(i), \end{cases}, \begin{matrix} k = 0 \sim K2-1 \\ \\ k = K2 \sim K-1 \end{matrix}$$

Herein, k, $P_{ref2}(k)$, $P_{0\_PUCCH}$, $PL_c(k)$, $h(n_{CQI}, n_{HARQ}, n_{SR})$, $\Delta_{F\_PUCCH}(F)$, $\Delta_{TxD}(F')$ and $g(i)$ respectively refer to an index of a given second reference power value in the K second reference power value(s), a second reference power value marked with index k, the seventh component, the eighth component, the fourth component, the fifth component, the sixth component, and the tenth component. The specific meaning of the $P_{0\_PUCCH}$, the $h(n_{CQI}, n_{HARQ}, n_{SR})$, the $\Delta_{F\_PUCCH}(F)$, the $\Delta_{TxD}(F')$ and the $g(i)$ can be found in TS36.213. The $P_{ref2}(k)$ marked with an integer index ranging from 0 to K2-1 belongs to the K2 first reference power value(s); the $P_{ref2}(k)$ marked with an integer index ranging from K2 to K-1 belongs to first reference power value(s) of the K first reference power values not belonging to the K2 first reference power value(s). The $PL_c(k)$ is a pathloss value determined by a measurement on a reference signal group marked with index k among the K reference signal groups.

In one sub-embodiment of the above embodiment, a sum of the R second offset(s) is equal to the $g(i)$.

In one sub-embodiment of the above embodiment, the K2 is equal to 1.

In one sub-embodiment of the above embodiment, the K2 is greater than 1.

In one sub-embodiment of the above embodiment, the K2 is equal to K.

In one sub-embodiment of the above embodiment, the K2 is equal to 0.

In one embodiment, the K difference value(s) respectively corresponds(correspond) to K reference power value(s).

In one sub-embodiment of the above embodiment, the K reference power value(s) is (are) respectively equal to corresponding first reference power value(s). The formula is described as:

$$P_{ref}(k) = P_{ref2}(k), k=0 \sim K-1$$

Herein, k and $P_{ref}(k)$ respectively refer to an index of a given reference power value in the K reference power value(s) and a reference power value marked with index k.

In one sub-embodiment of the above embodiment, each of the K reference power value(s) is equal to a logarithm of a sum of a linear value of corresponding first reference power value and a linear value of corresponding second reference power value with base 10 further multiplied by 10. The formula is described as:

$$P_{ref}(k) = 10\log_{10}(10^{P_{ref1}(k)/10} + 10^{P_{ref2}(k)/10}), k=0 \sim K-1$$

Herein, k and $P_{ref}(k)$ respectively refer to an index of a given reference power value in the K reference power value(s), and a reference power value marked with index k.

In one embodiment, the K difference value(s) is (are) respectively equal to difference(s) between a first limiting power value and corresponding reference power value(s). The formula is described as:

$$D(k) = P_{r,1} - P_{ref}(k), k=0 \sim K-1$$

Herein, k, D(k), and $P_{r,1}$ respectively refer to an index of a given difference value in the K difference value(s), a difference value marked with index k, and the first limiting power value.

In one sub-embodiment of the above embodiment, the first limiting power value is $\tilde{P}_{CMAX,c}(i)$, the specific meaning of the $\tilde{P}_{CMAX,c}(i)$ can be found in TS36.213.

In one embodiment, a first difference value is a difference between a second limiting power value and a corresponding reference power value, the first difference value is one of the K difference values, difference value(s) of the K difference values not belonging to the first difference value is (are)

respectively equal to difference(s) between a first limiting power value and corresponding reference power value(s). The formula is described as:

$$D(k) = \begin{cases} P_{r,2} - P_{ref}(k), & k = 0 \\ P_{r,1} - P_{ref}(k), & k = 1 \sim K-1 \end{cases}$$

Herein, k, D(k), $P_{r,1}$ and $P_{r,2}$ respectively refer to an index of a given difference value in the K difference value(s), a difference value marked with k, the first limiting power value and the second limiting power value. The D(k) marked with index 0 is the first difference value.

In one sub-embodiment, the second limiting power value is $P_{CMAX,c}(i)$ the specific meaning of the $P_{CMAX,c}(i)$ can be found in TS36.213.

In one embodiment, the K difference value(s) corresponds (correspond) to K target power value(s) respectively, the K difference value(s) is (are) respectively equal to difference(s) between target power value(s) and corresponding reference power value(s). The formula is described as:

$$D(k) = P_r(k) - P_{ref}(k), k = 0 \sim K-1$$

Herein, k, D(k), and $P_r(k)$ respectively refer to an index of a given difference value in the K difference value(s), a difference value marked with k, and a target power value marked with k.

In one sub-embodiment of the above embodiment, the K target power value(s) is (are) indicated by the first radio signal.

In one sub-embodiment of the above embodiment, the K target power value(s) is (are) configured by a downlink signaling.

In one embodiment, the first power is equal to the smaller one between a target first reference power value and a third limiting power value; the target first reference power value is a first reference power value of the K first reference power value(s) that is determined by a measurement on the first reference signal group. The formula is described as:

$$P_1 = \min(P_r, P_{ref1}(m))$$

Herein, $P_1$, $P_{r,3}$, m and $P_{ref1}(m)$ respectively refer to the first power, the third limiting power value, an index of the target first reference power value in the K first reference power value(s), and the target first reference power value.

In one sub-embodiment of the above embodiment, the first power is $P_{PUSCH,c}(i)$ the specific meaning of the $P_{PUSCH,c}(i)$ can be found in TS36.213.

In one sub-embodiment of the above embodiment, the third limiting power value is $P_{CMAX}(i)$, the specific meaning of the $P_{CMAX,c}(i)$ can be found in TS36.213.

In one sub-embodiment of the above embodiment, the third limiting power value is $10 \log_{10}(\hat{P}_{CMAX,c}(i) - \hat{P}_{PUCCH}(i))$ the specific meaning of $P_{CMAX,c}(i)$ and the $\hat{P}_{PUCCH}(i)$ can be found in TS36.213.

In one sub-embodiment of the above embodiment, the target first reference power value is a smallest first reference power value of the K1 first reference power value(s).

In one sub-embodiment of the above embodiment, a difference value of the K difference value(s) that corresponds to the target first reference power value is a largest difference value of difference value(s) corresponding to the K1 first reference power value(s).

In one embodiment, the first radio signal comprises at least one of uplink data or UCI.

In one embodiment, the first radio signal indicates an index of each of the K reference signal group(s) in the L reference signal groups.

In one embodiment, the first radio signal indicates first indication information, the first indication information is applied in the K difference value(s). The first indication information indicates whether a MAC entity has employed power backoff.

In one embodiment, a target first signaling is a latest first signaling among the R first signaling(s), the target first signaling comprises scheduling information of the first radio signal, the scheduling information of the first radio signal comprises at least one of time domain resources occupied, frequency domain resources occupied, an MCS, a HARQ process number, an RV or an NDI.

In one embodiment, the target first signaling is used by the U2 for determining an index of the first reference signal group in the K reference signal group(s).

In one embodiment, box F1, box F2 and box F3 in FIG. 1 all exist.

In one embodiment, box F1 and box F2 in FIG. 1 exist, while box F3 in FIG. 1 does not exist.

In one embodiment, box F1 in FIG. 1 exists, while box F2 and box F3 in FIG. 1 do not exist.

In one embodiment, box F1 and box F3 in FIG. 1 exist, while box F2 in FIG. 1 does not exist.

In one embodiment, box F1 in FIG. 1 does not exist, while box F2 and box F3 in FIG. 1 exist.

In one embodiment, box F1 and box F2 in FIG. 1 do not exist, while box F3 in FIG. 1 exists.

In one embodiment, box F1 and box F3 in FIG. 1 do not exist, while box F2 in FIG. 1 exists.

In one embodiment, box F1, box F2 and box F3 in FIG. 1 do not exist.

Embodiment 2

Figure 2:
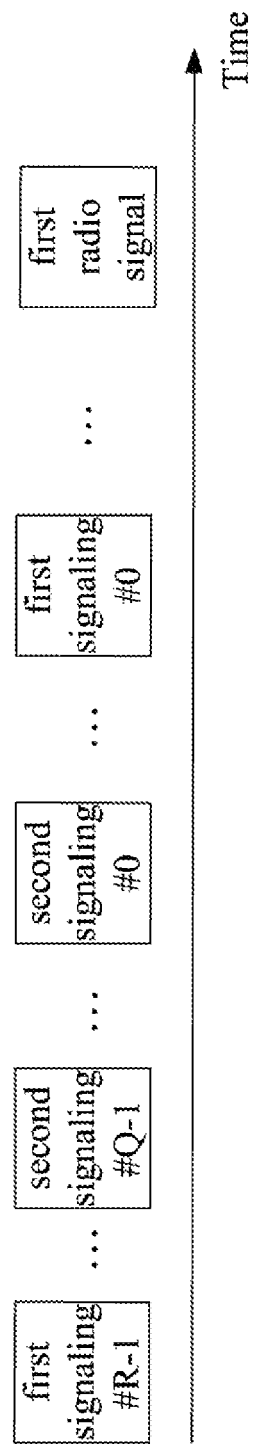
FIG. 2 illustrates a timing diagram of R first signalings, Q second signalings and a first radio signal according to one embodiment of the present disclosure.

Embodiment 2 illustrates a timing diagram of R first signalings, Q second signalings and a first radio signal, as shown in FIG. 2. In FIG. 2, indices of the R first signaling(s) are #0, #1, #2 . . . , #R-1, respectively; indices of the Q second signaling(s) are #0, #1, #2 . . . , #Q-1, respectively.

In Embodiment 2, time domain resources occupied by any two first signalings of the R first signalings are orthogonal (i.e., non-overlapping); time domain resources occupied by any two first signalings of the Q second signalings are orthogonal (i.e., non-overlapping); a time domain resource occupied by the first radio signal is after a time domain resource occupied by a first signaling #0 and a time domain resource occupied by a second signaling #0.

In one embodiment, the R first signalings are dynamic signalings respectively.

In one embodiment, the R first signalings are dynamic signalings used for Uplink Grant respectively.

In one embodiment, the R first signalings are respectively transmitted on a downlink physical layer control channel (i.e., a downlink channel that can only be used for bearing a physical layer signaling).

In one embodiment, the Q second signalings are dynamic signalings respectively.

In one embodiment, the Q second signalings are dynamic signalings used for Uplink Grant respectively.

In one embodiment, the Q second signalings are respectively transmitted on a downlink physical layer control channel (i.e., a downlink channel that can only be used for bearing a physical layer signaling).

In one embodiment, a first signaling #0 is a target first signaling, the target first signaling comprises scheduling information of the first radio signal, the scheduling information of the first radio signal comprises at least one of time domain resources occupied, frequency domain resources occupied, an MCS, a HARQ process number, an RV or an NDI.

Embodiment 3

Figure 3:
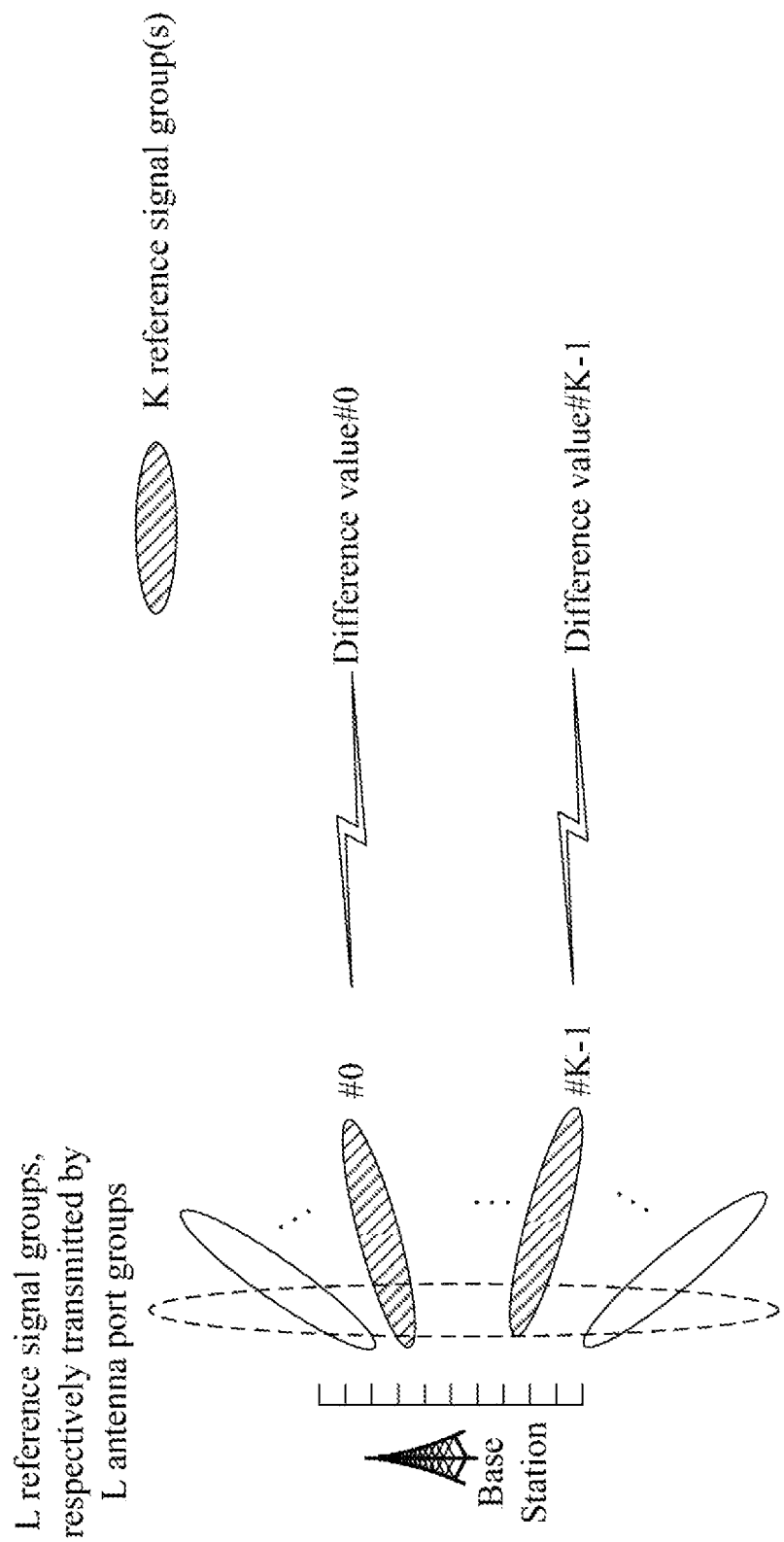
FIG. 3 illustrates a schematic diagram of a relationship between K reference signal group(s) and K difference value(s) according to one embodiment of the present disclosure.

Embodiment 3 illustrates a schematic diagram of a relationship between K reference signal group(s) and K difference value(s), as shown in FIG. 3.

In Embodiment 3, L reference signal groups are transmitted by L antenna port sets respectively, the K reference signal group(s) is (are) a subset of the L reference signal groups. The K difference value(s) respectively corresponds (correspond) to K first reference power value(s). Measurement(s) on K reference signal group(s) is (are) respectively used for determining the K first reference power value(s). The L is a positive integer greater than 1, the K is a positive integer not greater than the L.

In one embodiment, the K first reference power value(s) is (are) linearly correlated to the K pathloss value(s) respectively, the K pathloss value(s) is (are) respectively determined by measurement(s) on the K reference signal group(s).

In one embodiment, a given reference signal group is one of the K reference signal group(s), the given reference signal group consists of one reference signal, and a pathloss value of the given reference signal group is equal to a difference between a transmitting power of the given reference signal and an RSRP of the given reference signal.

In one embodiment, a given reference signal group is one of the K reference signal group(s), the given reference signal group consists of multiple reference signals, and a pathloss value of the given reference signal group is equal to a difference between an average transmitting power of reference signals in the given reference signal group and an average RSRP of reference signals in the given reference signal group.

In one embodiment, the K pathloss value(s) is (are) a subset of L pathloss values, the L pathloss values are respectively determined by measurements on the L reference signal groups. The K pathloss value(s) is (are) the smallest K pathloss value(s) of the L pathloss values.

In one embodiment, the K is configured by a higher layer signaling.

In one embodiment, the K pathloss value(s) is (are) all pathloss value(s) of the L pathloss values of which each pathloss value minus a minimum pathloss value has an absolute value less than a given threshold. The given threshold is configured by a higher layer signaling, the minimum pathloss value is a smallest pathloss value of the L pathloss values.

Embodiment 4

Figure 4:
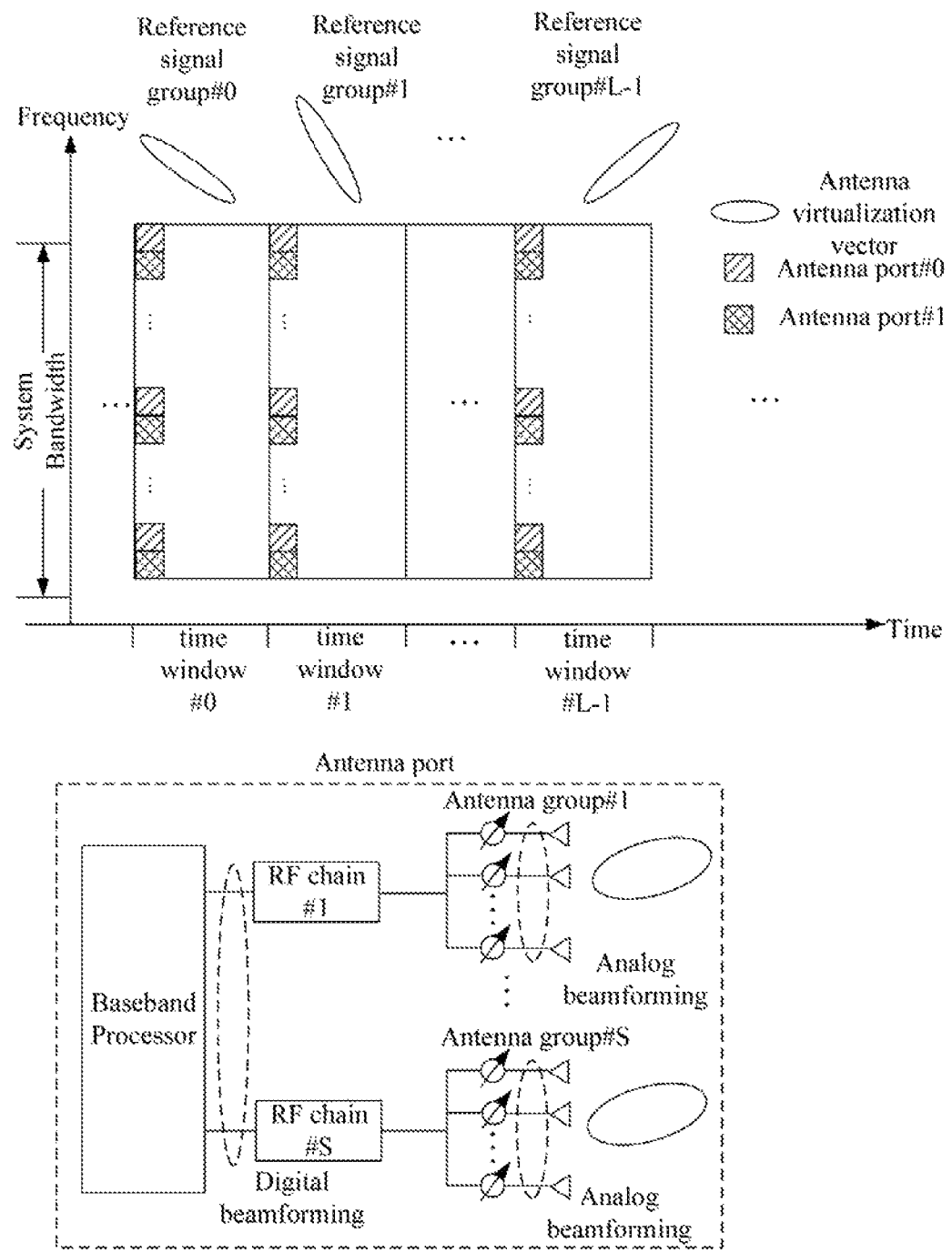
FIG. 4 illustrates a schematic diagram of resource mapping of L reference signal groups and a schematic diagram of beamforming of an antenna port set according to one embodiment of the present disclosure.

Embodiment 4 illustrates a schematic diagram of resource mapping of L reference signal groups and a schematic diagram of beamforming of an antenna port set, as shown in FIG. 4.

In Embodiment 4, the L reference signal groups are transmitted by L antenna port sets respectively, an antenna port set comprises 2 antenna ports. Any given reference signal group of the L reference signal groups comprises 2 reference signals, reference signals in the given reference signal group respectively correspond to antenna ports in an antenna port of the L antenna port sets that corresponds to the given reference signal group. Antennas configured by the base station are divided into multiple antenna groups, each of the antenna groups comprises multiple antennas. An antenna port is formed by superposing multiple antennas of one or more antenna groups through antenna virtualization. Mapping coefficients of the multiple antennas of one or more antenna groups to the antenna port constitute a beamforming vector of the antenna port. An antenna group is connected to a baseband processor via a Radio Frequency (RF) chain. A beamforming vector is generated as a Kronecker product of an analog beamforming vector and a digital beamforming vector. Mapping coefficients of multiple antennas in a same antenna group to an antenna port constitute an analog beamforming vector of the antenna group, each antenna group in an antenna set corresponds to a same analog beamforming vector. Mapping coefficients of different antennas comprised in an antenna port to the antenna port constitute a digital beamforming vector.

In one embodiment, FIG. 4 describes a transmission of the L reference signal groups, and the L reference signal groups are transmitted periodically, respectively.

In one embodiment, different antenna ports in an antenna port set correspond to a same analog beamforming vector.

In one embodiment, different antenna ports in an antenna port set correspond to different digital beamforming vectors.

In one embodiment, antenna ports in different antenna port sets correspond to different analog beamforming vectors.

In one embodiment, the L antenna port sets correspond to L antenna virtualization vectors respectively, the L antenna virtualization vectors are respectively used for analog beamforming of antenna ports in corresponding antenna port sets.

In one embodiment, different antenna port sets of the L antenna port sets comprise an equal number of antenna ports.

In one embodiment, each reference signal in the L reference signal groups comprises CSI-RS, respectively.

In one embodiment, time domain resources occupied by any two different reference signal groups of the L reference signal groups are mutually orthogonal (i.e., non-overlapping).

In one embodiment, reference signals in the L reference signal groups are wideband, respectively.

In one sub-embodiment of the above embodiment, a system bandwidth is divided into a positive integer number of frequency domain(s), reference signals in the L reference signal groups occur in all the frequency domain(s) within the system bandwidth, a bandwidth corresponding to the frequency domain(s) is equal to a difference value between frequencies of frequency units occupied by two adjacent appearances of one reference signal of the L reference signal groups.

In one embodiment, reference signals in the L reference signal groups are narrowband, respectively.

In one sub-embodiment of the above embodiment, a system bandwidth is divided in a positive integer number of frequency domain(s), reference signals in the L reference signal groups only occur in part of the frequency domain(s).

In one embodiment, within a time window, a reference signal in the L reference signal groups employs a pattern of CSI-RS.

In one embodiment, the time window in FIG. 4 comprises Q1 Orthogonal Frequency Division Multiplexing (OFDM) symbols, the Q1 is one of 2, 4, 7 and 14.

Embodiment 5

Figure 5:
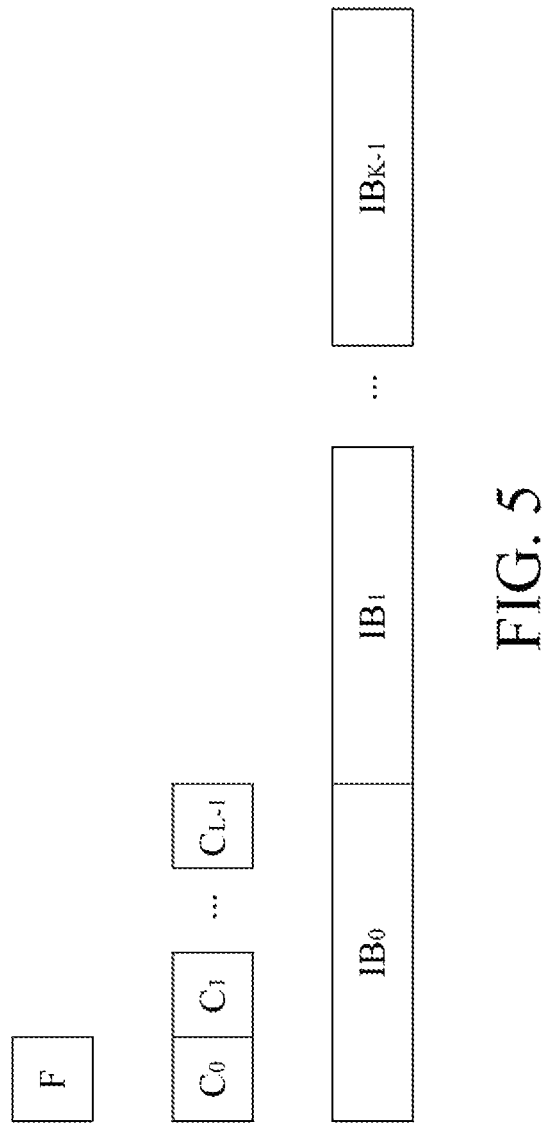
FIG. 5 illustrates a schematic diagram of a part of a first radio signal that is used for indicating the K difference values according to one embodiment of the present disclosure.

Embodiment 5 illustrates a schematic diagram of a part of a first radio signal that is used for indicating the K difference values, as shown in FIG. 5.

In FIG. 5, the first radio signal comprises three parts of information, wherein a first part is a flag F, a second part is a bitgraph consisting of L bits (C0-CL-1), and a third part is K information blocks (IB0-IBK-1).

In Embodiment 5, the first part is applicable to the K difference value(s) indicated by the third part, the flag F indicates whether the MAC entity has adopted power back-off. L bits in the second part respectively indicate whether each reference signal group in the L reference signal groups is chosen, a state of K bits in the L bits is a first state, and a state of the other bit(s) is a second state. K reference signal groups corresponding to the K bits respectively correspond to the K information blocks. The K information blocks in the third part respectively indicate the K difference values in the present disclosure.

In one embodiment, the first state is 1, the second state is 0.

In one embodiment, the first state is 0, the second state is 1.

In one embodiment, each information block of the K information blocks is comprised of 6 bits.

In one embodiment, the first radio signal further comprises uplink data.

Embodiment 6

Figure 6:
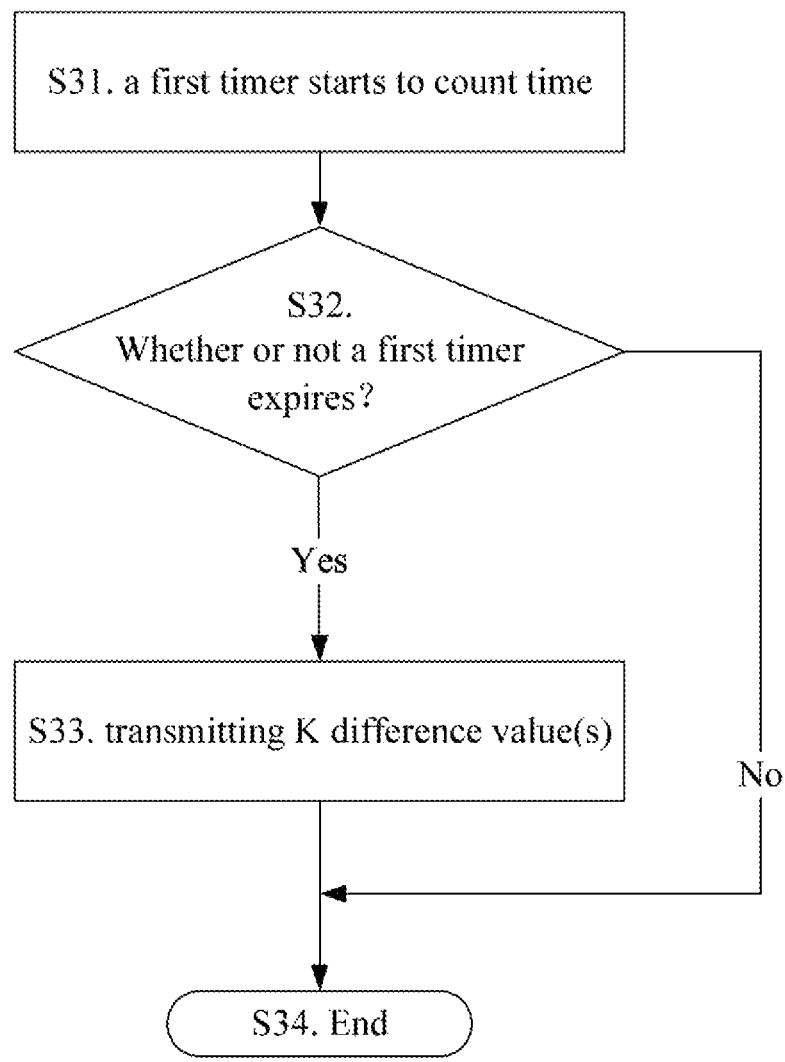
FIG. 6 illustrates a flowchart of determining whether K difference value(s) is (are) transmitted according to one embodiment of the present disclosure.

Embodiment 6 illustrates a flowchart of determining whether K difference value(s) is (are) transmitted, as shown in FIG. 6. The flowchart in FIG. 6 is implemented at the UE side.

In Embodiment 6, in step S31, the first timer starts time counting; in step S32, it is determined whether the first timer expires; if expired, then in step S33 the K difference value(s) will be transmitted; if not expired, then move on to step S34 to come to an end.

In one embodiment, the first timer is a periodicPHR-Timer.

Embodiment 7

Figure 7:
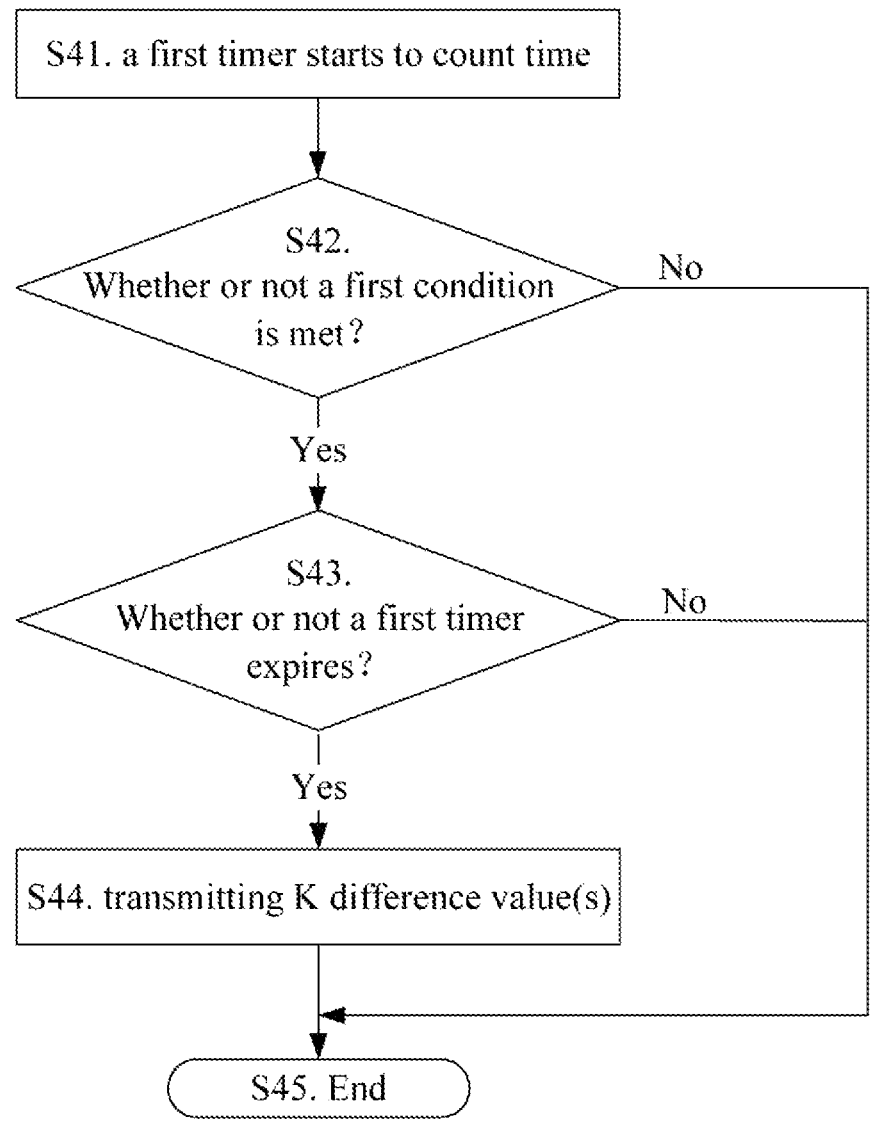
FIG. 7 illustrates a flowchart of determining whether K difference value(s) is (are) transmitted according to another embodiment of the present disclosure.

Embodiment 7 illustrates a flowchart of determining whether K difference value(s) is (are) transmitted, as shown in FIG. 7. The flowchart in FIG. 7 is implemented at the UE side.

In Embodiment 7, in step S41, the first timer starts time counting; in step S42, it is determined whether a first condition is met; if the first condition is not met, then move on to step S45 to come to an end; if the first condition is met, then in step S43 it is determined whether the first timer expires; if expired, then in step S44 the K difference value(s) is (are) transmitted; if not expired, then move on to step S45 to come to an end.

In one embodiment, the first timer is a prohibitPHR-Timer.

In one embodiment, the first condition is: a change in an average of K pathloss value(s) is greater than a first threshold, the K pathloss value(s) is (are) respectively determined by measurement(s) on the K reference signal group(s).

In one sub-embodiment of the above embodiment, the first threshold is fixed or configured by a higher layer signaling.

In one sub-embodiment of the above embodiment, the first condition is: within a given time window, a difference between a maximum value of an average of the K pathloss values detected by the UE and a minimum value of an average of the K pathloss values detected by the UE is greater than the first threshold.

In one sub-embodiment of the above embodiment, the given time window is smaller than a periodicPHR-Timer.

In one sub-embodiment of the above embodiment, a given reference signal group is one of the K reference signal group(s), the given reference signal group consists of one reference signal, and a pathloss value of the given reference signal group is equal to a difference between a transmitting power of the given reference signal and an RSRP of the given reference signal.

In one sub-embodiment of the above embodiment, a given reference signal group is one of the K reference signal group(s), the given reference signal group consists of multiple reference signals, and a pathloss value of the given reference signal group is equal to a difference between an average transmitting power of reference signals in the given reference signal group and an average RSRP of reference signals in the given reference signal group.

In one embodiment, the first condition is: a change in a first pathloss value of the K pathloss value(s) is greater than a second threshold, the first pathloss value is a pathloss value with a biggest change among the K pathloss value(s).

In one sub-embodiment of the above embodiment, the second threshold is fixed or configured by a higher layer signaling.

In one sub-embodiment of the above embodiment, the first condition is: within a given time window, a difference between a maximum value of the first pathloss value detected by the UE and a minimum value of the first pathloss value detected by the UE is greater than the second threshold.

In one embodiment, the first condition is: a change in a second pathloss value of the K pathloss value(s) is greater than a third threshold, the second pathloss value is a pathloss value with a smallest change among the K pathloss value(s).

In one sub-embodiment of the above embodiment, the third threshold is fixed or configured by a higher signaling.

In one sub-embodiment of the above embodiment, the first condition is: within a given time window, a difference between a maximum value of the second pathloss value detected by the UE and a minimum value of the second pathloss value detected by the UE is greater than the third threshold.

In one embodiment, the condition is: a change in a reference pathloss value is greater than a fourth threshold, the reference pathloss value is linearly correlated to each of the K pathloss value(s) respectively.

In one sub-embodiment of the above embodiment, the fourth threshold is fixed or configured by a higher signaling.

In one sub-embodiment of the above embodiment, the first condition is: within a given time window, a difference between a maximum value of the reference pathloss value detected by the UE and a minimum value of the reference pathloss value detected by the UE is greater than the fourth threshold.

In one sub-embodiment of the above embodiment, there are at least two pathloss values in the K pathloss values wherein linear coefficients respectively between the two pathloss values and the reference pathloss value are unequal.

In one sub-embodiment of the above embodiment, a linear coefficient between the reference pathloss value and each pathloss value of the K pathloss values is a real number greater than 0, or less than or equal to 1, respectively.

In one embodiment, d1-PathlossChange, an RRC signaling, comprises at least one of the first threshold, the second threshold, the third threshold or the fourth threshold.

Embodiment 8

Figure 8:
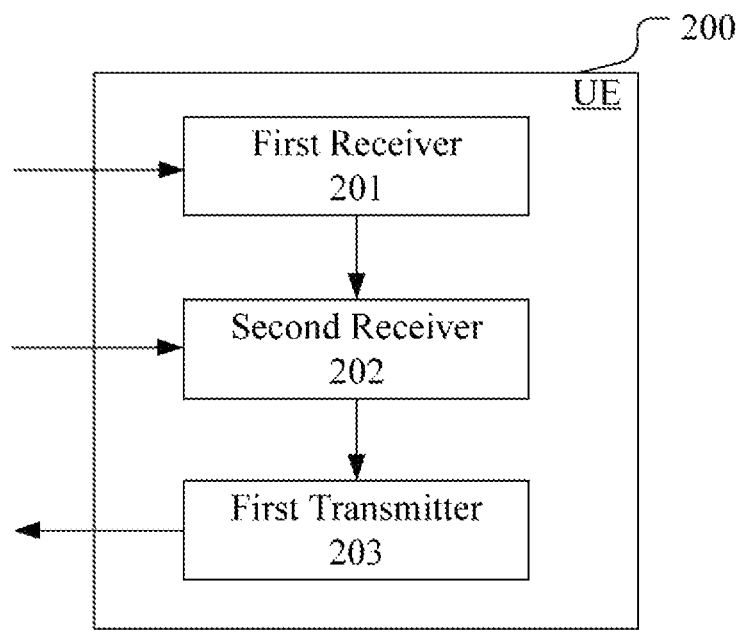
FIG. 8 illustrates a structure block diagram of a processing device in a UE according to one embodiment of the present disclosure.

Embodiment 8 illustrates a structure block diagram of a processing device in a UE, as shown in FIG. 8. In FIG. 8, a UE device 200 mainly consists of a first receiver 201, a second receiver 202 and a first transmitter 203.

In Embodiment 8, the first receiver 201 receives L reference signal groups; the second receiver 202 receives R first signaling(s); and a first transmitter 203 transmits a first radio signal.

In Embodiment 8, the L reference signal groups are transmitted by L antenna port sets respectively, the R first signaling(s) is (are) respectively used by the first transmitter 203 for determining R first offset(s); the first radio signal comprises a first report, the first report is used for determining K difference value(s), the K difference value(s) respectively corresponds(correspond) to K first reference power value(s). Each of the K first reference power value(s) is linearly correlated to a sum of the R first offset(s). Measurement(s) on K reference signal group(s) is (are) respectively used by the first transmitter 203 for determining the K first reference power value(s), the K reference signal group(s) is (are) a subset of the L reference signal groups. A transmitting power of the first radio signal is a first power, the first power is associated to a first reference signal group, the first reference signal group is one of the K reference signal group(s); the R first offset(s) is (are) used by the first transmitter 203 for determining the first power. An antenna port set comprises a positive integer number of antenna port(s). All antenna ports of the L antenna port sets are used for one same serving cell, or all antenna ports of the L antenna port sets are used for one same carrier. The L is a positive integer greater than 1, the K is a positive integer not greater than the L, the R is a positive integer.

In one embodiment, the first report is triggered by a given condition; the given condition comprises at least one of the following:

a change in an average of K pathloss value(s) is greater than a first threshold, a change in a first pathloss value of the K pathloss value(s) is greater than a second threshold, the first pathloss value is a pathloss value with a biggest change among the K pathloss value(s), a change in a second pathloss value of the K pathloss value(s) is greater than a third threshold, the second pathloss value is a pathloss value with a smallest change among the K pathloss value(s), a change in a reference pathloss value is greater than a fourth threshold, the reference pathloss value is linearly correlated to each of the K pathloss value(s) respectively, a first timer completes time counting, the UE receives a target signaling, the target signaling is used for triggering the first report;

herein, the K pathloss value(s) is (are) respectively determined by measurement(s) on the K reference signal group(s).

In one embodiment, the second receiver 202 is also used for receiving Q second signaling(s). Herein, the Q second signaling(s) is (are) respectively used by the first transmitter 203 for determining Q second offset(s), the K difference value(s) respectively corresponds(correspond) to K second reference power value(s), each of the K second reference power value(s) is linearly correlated to a sum of the Q second offset(s), measurement(s) on the K reference signal group(s) is (are) respectively used by the first transmitter 203 for determining the K second reference power value(s). The Q is a positive integer.

In one embodiment, a target first signaling is a latest first signaling among the R first signaling(s), the target first signaling comprises scheduling information of the first radio signal, the scheduling information of the first radio signal comprises at least one of time domain resources occupied, frequency domain resources occupied, an MCS, a HARQ process number, an RV or an NDI.

In one embodiment, the K difference value(s) corresponds (correspond) to K reference power value(s) respectively, a given reference power value is any reference power value of the K reference power value(s); the given reference power value is determined by a corresponding first reference power value and a corresponding second reference power value; or the given reference power value is equal to a corresponding first reference power value.

In one embodiment, the K difference value(s) is (are) respectively equal to difference(s) between a first limiting power value and corresponding reference power value(s); or a first difference value is equal to a difference between a second limiting power value and a corresponding reference power value, the first difference value is one of the K difference values, difference value(s) of the K difference values other than the first difference value is (are) respectively equal to difference(s) between a first limiting power value and a corresponding reference power value(s); or the K difference value(s) respectively corresponds(correspond) to K target power value(s), the K difference value(s) is (are) respectively equal to difference(s) between corresponding target power value(s) and corresponding reference power value(s).

In one embodiment, the first receiver 201 also receives a first downlink signaling and a second downlink signaling. Herein, the first downlink signaling indicates a time length of the first timer, the second downlink signaling is used for determining at least one of the first threshold, the second threshold, the third threshold or the fourth threshold.

Embodiment 9

Figure 9:
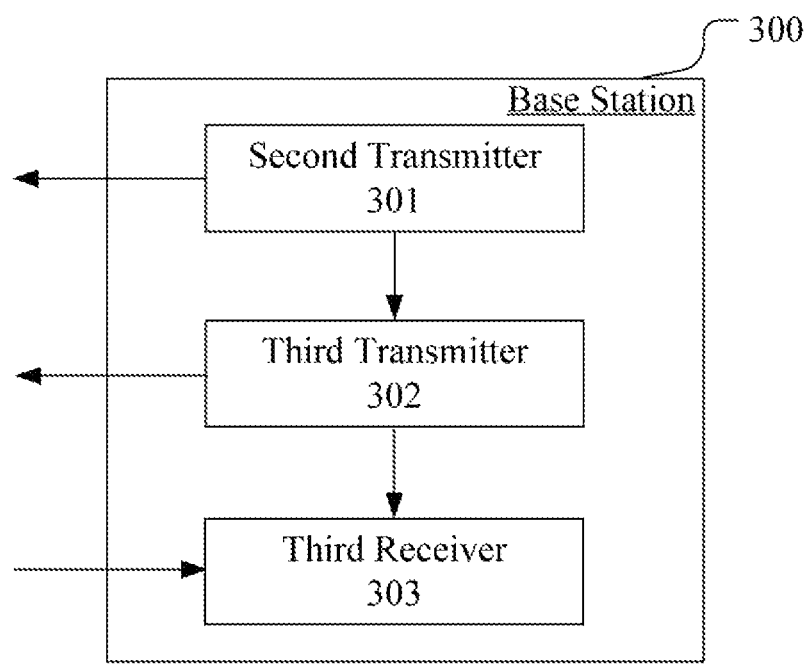
FIG. 9 illustrates a structure block diagram of a processing device in a base station according to one embodiment of the present disclosure.

Embodiment 9 illustrates a structure block diagram of a processing device in a base station, as shown in FIG. 9. In FIG. 9, a base station device 300 mainly consists of a second transmitter 301, a third transmitter 302 and a third receiver 303.

In Embodiment 9, a second transmitter 301 transmits L reference signal groups; a third transmitter 302 transmits R first signaling(s); and a third receiver 303 receives a first radio signal.

In Embodiment 9, the L reference signal groups are transmitted by L antenna port sets respectively, the R first signaling(s) is (are) respectively used for determining R first offset(s); the first radio signal comprises a first report, the first report is used by the third receiver 303 for determining K difference value(s), the K difference value(s) respectively corresponds(correspond) to K first reference power value(s). Each of the K first reference power value(s) is linearly correlated to a sum of the R first offset(s). Measurement(s) on K reference signal group(s) is (are) respectively used for determining the K first reference power value(s), the K reference signal group(s) is (are) a subset of the L reference signal groups. A transmitting power of the first radio signal is a first power, the first power is associated to a first reference signal group, the first reference signal group is one of the K reference signal group(s). The R first offset(s) is (are) used for determining the first power. An antenna port set comprises a positive integer number of antenna port(s). All antenna ports of the L antenna port sets are used for one same serving cell, or all antenna ports of the L antenna port sets are used for one same carrier. The L is a positive integer greater than 1, the K is a positive integer not greater than the L, the R is a positive integer.

In one embodiment, the first report is triggered by a given condition; the given condition comprises at least one of the following:

a change in an average of K pathloss value(s) is greater than a first threshold, a change in a first pathloss value of the K pathloss value(s) is greater than a second threshold, the first pathloss value is a pathloss value with a biggest change among the K pathloss value(s), a change in a second pathloss value of the K pathloss value(s) is greater than a third threshold, the second pathloss value is a pathloss value with a smallest change among the K pathloss value(s), a change in a reference pathloss value is greater than a fourth threshold, the reference pathloss value is linearly correlated to each of the K pathloss value(s) respectively, a first timer completes time counting, the UE receives a target signaling, the target signaling is used for triggering the first report;

herein, the K pathloss value(s) is (are) respectively determined by measurement(s) on the K reference signal group(s).

In one embodiment, the third transmitter 302 also transmits Q second signaling(s). Herein, the Q second signaling(s) is (are) respectively used for determining Q second offset(s), the K difference value(s) corresponds(correspond) to K second reference power value(s) respectively, each of the K second reference power value(s) is linearly correlated to a sum of the Q second offset(s), the measurement(s) on the K reference signal group(s) is (are) respectively used for determining the K second reference power value(s). The Q is a positive integer.

In one embodiment, a target first signaling is a latest first signaling among the R first signaling(s), the target first signaling comprises scheduling information of the first radio signal, the scheduling information of the first radio signal comprises at least one of time domain resources occupied, frequency domain resources occupied, an MCS, a HARQ process number, an RV or an NDI.

In one embodiment, the K difference value(s) corresponds (correspond) to K reference power value(s) respectively, a given reference power value is any reference power value of the K reference power value(s); the given reference power value is determined by a corresponding first reference power value and a corresponding second reference power value; or the given reference power value is equal to a corresponding first reference power value.

In one embodiment, the K difference value(s) is (are) respectively equal to difference(s) between a first limiting power value and corresponding reference power value(s); or a first difference value is equal to a difference between a second limiting power value and a corresponding reference power value, the first difference value is one of the K difference values, difference value(s) of the K difference values other than the first difference value is (are) respectively equal to difference(s) between a first limiting power value and corresponding reference power value(s); or the K difference value(s) respectively corresponds(correspond) to K target power value(s), the K difference value(s) is (are) respectively equal to difference(s) between corresponding target power value(s) and corresponding reference power value(s).

In one embodiment, the second transmitter 301 also transmits a first downlink signaling and a second downlink signaling. Herein, the first downlink signaling indicates a time length of the first timer, the second downlink signaling is used for determining at least one of the first threshold, the second threshold, the third threshold or the fourth threshold.

Embodiment 10

Figure 10:
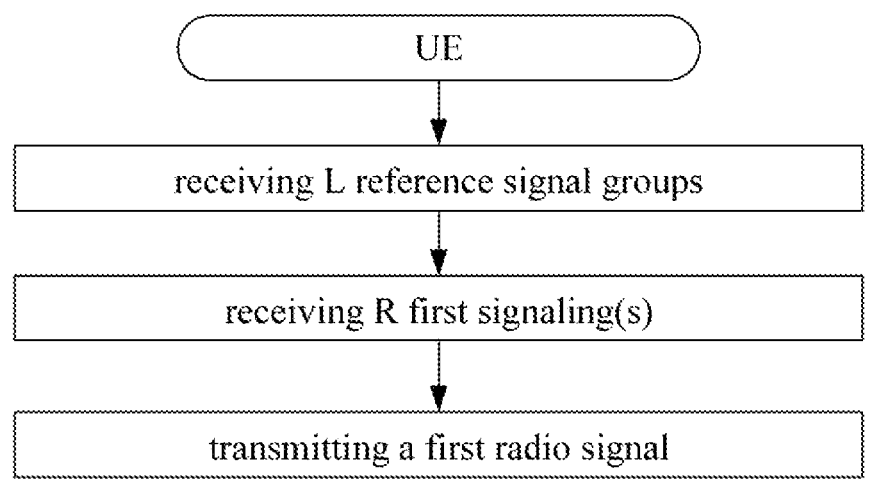
FIG. 10 illustrates a flowchart of L reference signal groups, R first signaling(s) and a first radio signal according to one embodiment of the present disclosure.

Embodiment 10 illustrates a flowchart of L reference signal groups, R first signaling(s) and a first radio signal, as shown in FIG. 10.

In Embodiment 10, the UE in the present disclosure receives L reference signal groups; receives R first signaling(s); and transmits a first radio signal. The L reference signal groups are transmitted by L antenna port sets respectively, the R first signaling(s) is (are) used for determining R first offset(s), the first radio signal comprises a first report, the first report is used for determining K difference value(s), the K difference value(s) respectively corresponds (correspond) to K first reference power value(s); each of the K first reference power value(s) is linearly correlated to a sum of the R first offset(s); measurement(s) on K reference signal group(s) is (are) respectively used for determining the K first reference power value(s), the K reference signal group(s) is (are) a subset of the L reference signal groups; a transmitting power of the first radio signal is a first power; the first power is associated with a first reference signal group; the first reference signal group is one of the K reference signal group(s); the R first offset(s) is (are) used for determining the first power; an antenna port set comprises a positive integer number of antenna port(s); all antenna ports of the L antenna port sets are used for one same serving cell, or all antenna ports of the L antenna port sets are used for one same carrier; the L is a positive integer greater than 1, the K is a positive integer not greater than the L, the R is a positive integer.

In one embodiment, the K difference value(s) is (are) respectively carried by a higher layer signaling.

In one sub-embodiment of the above embodiment, the higher layer signaling is a MAC layer signaling.

In one embodiment, the K is greater than 1.

In one embodiment, the L antenna port sets correspond to L antenna virtualization vectors respectively, the L antenna virtualization vectors are respectively used for analog beamforming of antenna ports in corresponding antenna port sets.

In one embodiment, numbers of antenna ports comprised in different antenna port sets of the L antenna port sets are equal.

In one embodiment, at least two antenna port sets in the L antenna port sets comprise unequal numbers of antenna ports.

In one embodiment, any given reference signal group in the L reference signal groups comprises a positive integer number of reference signal(s), the reference signal(s) in the given reference signal group respectively corresponds(correspond) to antenna port(s) in a transmitting antenna port set corresponding to the given reference signal group.

In one sub-embodiment of the above embodiment, the given reference signal comprises CSI-RS.

In one embodiment, the R first signaling(s) is (are) dynamic signaling(s), respectively.

In one embodiment, the R first signaling(s) is (are) dynamic signaling(s) used for Uplink Grant, respectively.

In one embodiment, the R first signaling(s) respectively indicates(indicate) the R first offset(s).

In one embodiment, the R first offset(s) is (are) respectively indicated by TPC.

In one embodiment, the first report comprises PHR.

In one embodiment, the K difference value(s) is (are) PH, respectively.

In one embodiment, a unit of each of the K difference value(s) is dB.

In one embodiment, a unit of each of the K first reference power value(s) is dBm.

In one embodiment, a linear coefficient between each of the K first reference power value(s) and a sum of the R first offset(s) is 1.

In one embodiment, a sum of the R first offset(s) is used for determining $f_c(i)$, the $f_c(i)$ is a state of power control adjustment on a PUSCH of an i-th subframe in a serving cell marked with index c, the first radio signal is transmitted on the serving cell marked with index c. The specific meaning of the $f_c(i)$ can be found in TS36.213.

In one embodiment, a sum of the R first offset(s) is equal to the $f_c(i)$.

In one embodiment, the K pathloss value(s) is (are) a subset of L pathloss values, the L pathloss values are respectively determined by measurements on the L reference signal groups. The K pathloss value(s) is (are) the smallest K pathloss value(s) of the L pathloss values.

In one embodiment, the K is configured by a higher layer signaling.

In one embodiment, the K pathloss value(s) is (are) all pathloss value(s) of the L pathloss values of which each pathloss value minus a minimum pathloss value has an absolute value less than a given threshold. The given threshold is configured by a higher layer signaling, the minimum pathloss value is a smallest pathloss value of the L pathloss values.

In one embodiment, a unit of the first power is dBm.

In one embodiment, measurements on all reference signals in the first reference signal group are used for determining the first power.

In one embodiment, a pathloss value of the K pathloss value(s) that corresponds to the first reference signal group is used for determining the first power.

In one embodiment, the first power is equal to a target first reference power value; the target first reference power value is a first reference power value of the K first reference power value(s) that is determined by a measurement on the first reference signal group.

In one sub-embodiment of the above embodiment, the target first reference power value is a smallest first reference power value of the K1 first reference power values.

In one sub-embodiment of the above embodiment, a difference value of the K difference values that corresponds to the target first reference power value is a largest difference value of difference values corresponding to the K1 first reference power values among the K difference values.

In one embodiment, the first radio signal comprises at least one of uplink data or UCI.

In one embodiment, the first radio signal indicates an index of each of the K reference signal group(s) in the L reference signal groups.

In one embodiment, the first radio signal indicates first indication information, the first indication information is applied in the K difference value(s). The first indication information indicates whether a MAC entity has employed power backoff.

Embodiment 11

Figure 11:
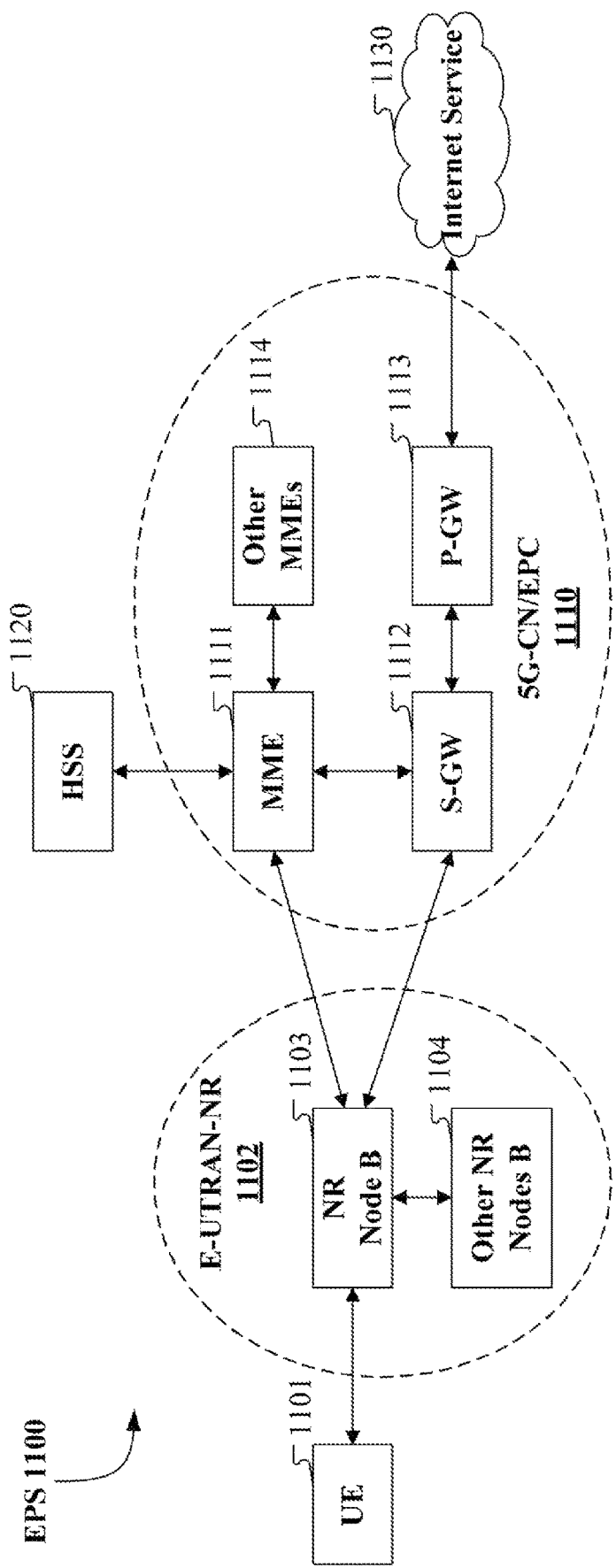
FIG. 11 illustrates a schematic diagram of a network architecture according to one embodiment of the present disclosure.

Embodiment 11 illustrates a schematic diagram of a network architecture, as shown in FIG. 11.

FIG. 11 is a diagram illustrating a network architecture 1100 of Long-Term Evolution (LTE), Long-Term Evolution Advanced (LTE-A) and future 5G systems. The LTE network architecture 1100 may be called an Evolved Packet System (EPS) 1100. The EPS 1100 may comprise one or more UEs 1101, an E-UTRAN-NR 1102, a 5G-Core Network/Evolved Packet Core (5G-CN/EPC) 1110, a Home Subscriber Server (HSS) 1120 and an Internet Service 1130. Herein, UMTS refers to Universal Mobile Telecommunications System. The EPS 1100 may be interconnected with other access networks. For simple description, the entities/interfaces are not shown. As shown in FIG. 11, the EPS 1100 provides packet switching services. Those skilled in the art will find it easy to understand that various concepts presented throughout the present disclosure can be extended to networks providing circuit switching services. The E-UTRAN-NR 1102 comprises an NR node B (gNB) 1103 and other gNBs 1104. The gNB 1103 provides UE 1101 oriented user plane and control plane protocol terminations. The gNB 1103 may be connected to other gNBs 1104 via an X2 interface (for example, backhaul). The gNB 1103 may be called a base station, a base transceiver station, a radio base station, a radio transceiver, a transceiver function, a Base Service Set (BSS), an Extended Service Set (ESS), a Transmitter Receiver Point (TRP) or some other applicable terms. The gNB 1103 provides an access point of the 5G-CN/EPC 1110 for the UE 1101. Examples of UE 1101 include cellular phones, smart phones, Session Initiation Protocol (SIP) phones, laptop computers, Personal Digital Assistant (PDA), Satellite Radios, Global Positioning Systems (GPSs), multimedia devices, video devices, digital audio players (for example, MP3 players), cameras, games consoles, unmanned aerial vehicles, air vehicles, narrow-band physical network equipment, machine-type communication equipment, land vehicles, automobiles, wearable equipment, or any other devices having similar functions. Those skilled in the art also can call the UE 1101 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 1103 is connected to the 5G-CN/EPC 1110 via an S1 interface. The 5G-CN/EPC 1110 comprises an MME 1111, other MMES 1114, a Service Gateway (S-GW) 1112 and a Packet Date Network Gateway (P-GW) 1113. The MME 1111 is a control node for processing a signaling between the UE 1101 and the 5G-CN/EPC 1110. Generally, the MME 1111 provides bearer and connection management. All user Internet Protocol (IP) packets are transmitted through the S-GW 1112, the S-GW 1112 is connected to the P-GW 1113. The P-GW 1113 provides UE IP address allocation and other functions. The P-GW 1113 is connected to the Internet Service 1130. The Internet Service 1130 comprises IP services corresponding to operators, specifically including Internet, Intranet, IP Multimedia Subsystem (IMS) and Packet Switching Streaming Services (PSSs).

In one embodiment, the UE 1101 corresponds to the UE in the present disclosure.

in one embodiment, the gNB 1103 corresponds to the base station in the present disclosure.

Embodiment 12

Figure 12:
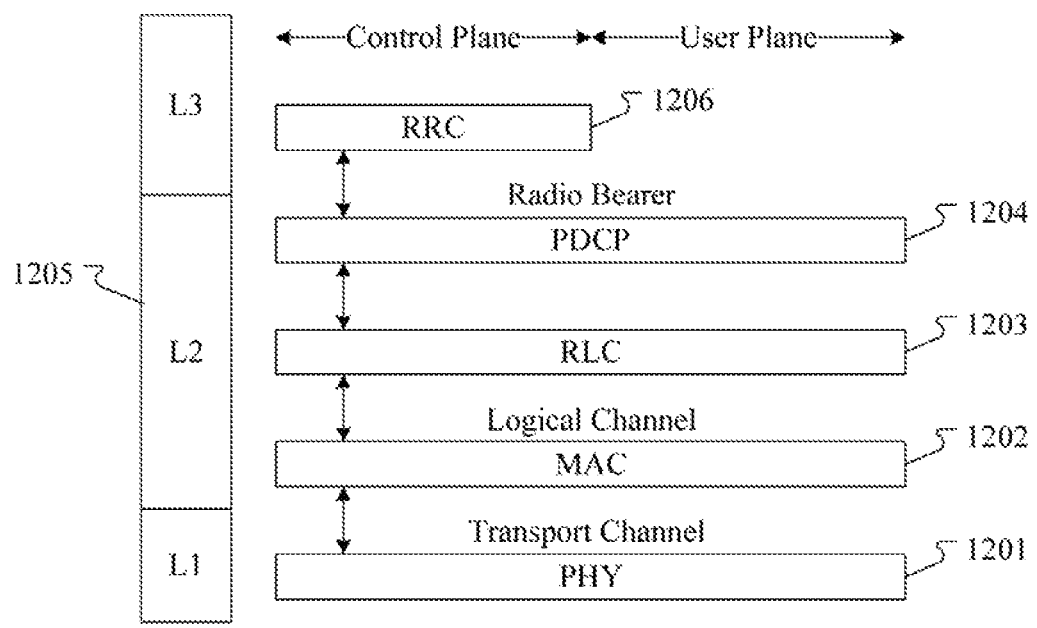
FIG. 12 illustrates a schematic diagram of a radio protocol architecture of a user plane and a control plane according to one embodiment of the present disclosure.

Embodiment 12 illustrates a schematic diagram of a radio protocol architecture of a user plane and a control plane, as shown in FIG. 12.

FIG. 12 is a diagram illustrating an embodiment of a radio network architecture used for a user plane and a control plane. As shown in FIG. 12, the radio network architecture for a UE and a gNB is represented by three layers, which are a layer 1, a layer 2 and a layer 3. The layer 1 (L1) is a lowest layer and implements signal processing functions of various PHY layers. The L1 is called PHY 1201 in the present disclosure. The layer 2 (L2) 1205 is above the PHY 1201, and is in charge of the link between the UE and the gNB via the PHY 1201. In the user plane, L2 1205 comprises a Medium Access Control (MAC) sublayer 1202, a Radio Link Control (RLC) sublayer 1203 and a Packet Data Convergence Protocol (PDCP) sublayer 1204. All the three sublayers terminate at the gNBs of the network side. Although not described in FIG. 12, the UE may comprise several protocol layers above the L2 1205, such as a network layer (i.e., IP layer) terminated at a P-GW 1113 of the network side and an application layer terminated at the other side of the connection (i.e., a peer UE, a server, etc.). The PDCP sublayer 1204 provides multiplexing among variable radio bearers and logical channels. The PDCP sublayer 1204 also provides a header compression for a higher-layer packet so as to reduce a radio transmission overhead. The PDCP sublayer 1204 provides security by encrypting a packet and provides support for UE handover between gNBs. The RLC sublayer 1203 provides segmentation and reassembling of a higher-layer packet, retransmission of a lost packet, and reordering of a packet so as to compensate the disordered receiving caused by Hybrid Automatic Repeat reQuest (HARQ). The MAC sublayer 1202 provides multiplexing between a logical channel and a transport channel. The MAC sublayer 1202 is also responsible for allocating between UEs various radio resources (i.e., resource block) in a cell. The MAC sublayer 1202 is also in charge of HARQ operation. In the control plane, the radio protocol architecture of the UE and the gNB is almost the same as the radio protocol architecture in the user plane on the PHY 1201 and the L2 1205, but there is no header compression for the control plane. The control plane also comprises a Radio Resource Control (RRC) sublayer 1206 in the layer 3 (L3). The RRC sublayer 1206 is responsible for acquiring radio resources (i.e., radio bearer) and configuring the lower layer using an RRC signaling between the gNB and the UE.

In one embodiment, the radio protocol architecture in FIG. 12 is applicable to the UE in the present disclosure.

In one embodiment, the radio protocol architecture in FIG. 12 is applicable to the base station in the present disclosure.

In one embodiment, the L reference signal groups in the present disclosure are generated by the PHY 1201.

In one embodiment, the R first signaling(s) in the present disclosure is (are) generated by the PHY 1201.

In one embodiment, the R first signaling(s) in the present disclosure is (are) generated by the MAC sublayer 1202.

In one embodiment, the R first signaling(s) in the present disclosure is (are) generated by the RRC sublayer 1206.

In one embodiment, the first radio signal in the present disclosure is generated by the PHY 1201.

In one embodiment, the Q second signaling(s) in the present disclosure is (are) generated by the PHY 1201.

In one embodiment, the Q second signaling(s) in the present disclosure is (are) generated by the MAC sublayer 1202.

In one embodiment, the Q second signaling(s) in the present disclosure is (are) generated by the RRC sublayer 1206.

In one embodiment, the first downlink signaling in the present disclosure is generated by the PHY 1201.

In one embodiment, the first downlink signaling in the present disclosure is generated by the MAC sublayer 1202.

In one embodiment, the first downlink signaling in the present disclosure is generated by the RRC sublayer 1206.

In one embodiment, the second downlink signaling in the present disclosure is generated by the PHY 1201.

In one embodiment, the second downlink signaling in the present disclosure is generated by the MAC sublayer 1202.

In one embodiment, the second downlink signaling in the present disclosure is generated by the RRC sublayer 1206.

Embodiment 13

Figure 13:
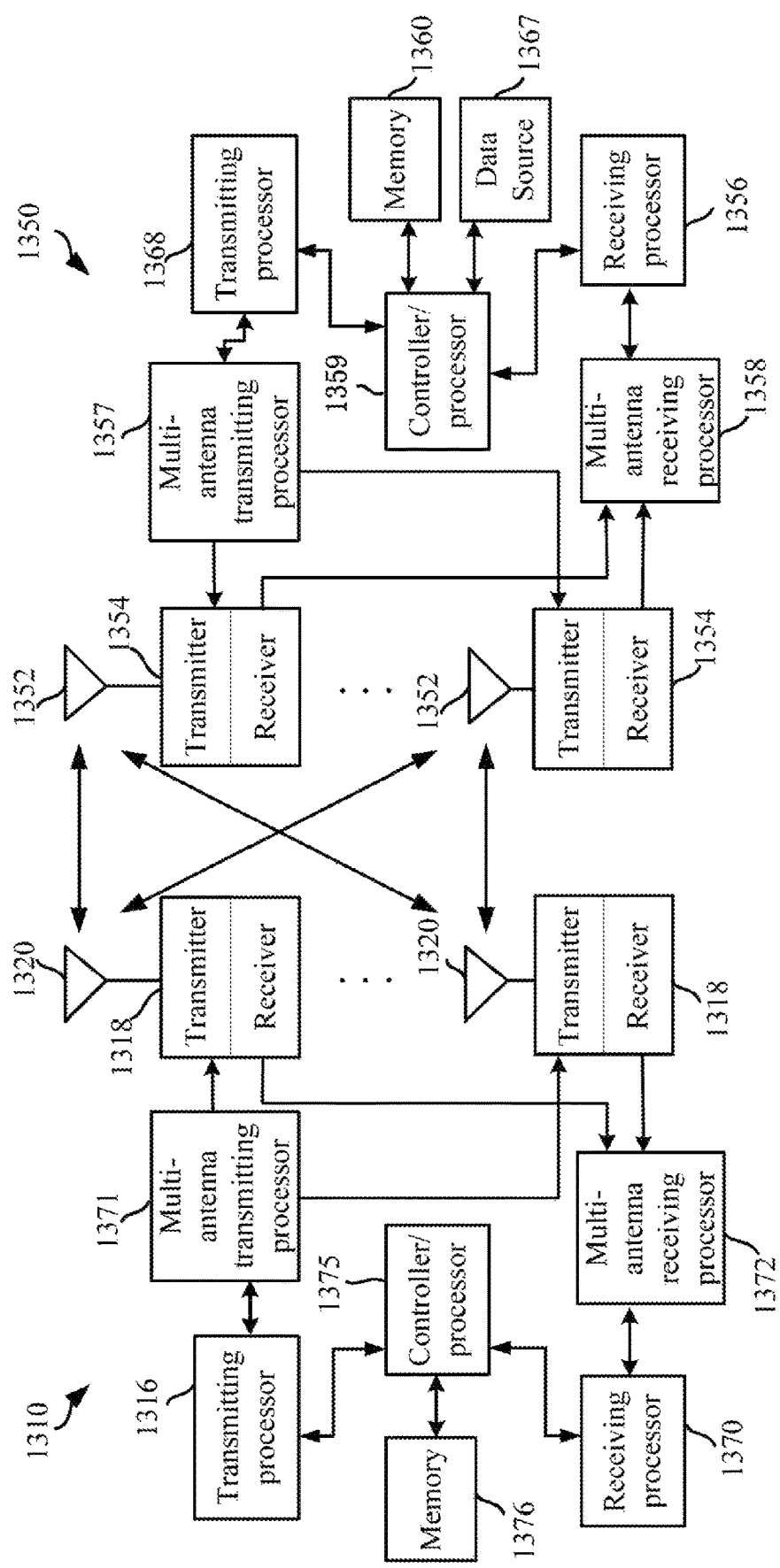
FIG. 13 illustrates a schematic diagram of an evolved node and a UE according to one embodiment of the present disclosure.

Embodiment 13 illustrates a schematic diagram of an NR node and a UE, as shown in FIG. 13. FIG. 13 is a block diagram illustrating a UE 1350 and a gNB 1310 that are in communication with each other in access network.

The gNB 1310 comprises a controller/processor 1375, a memory 1376, a receiving processor 1370, a transmitting processor 1316, a multi-antenna receiving processor 1372, a multi-antenna transmitting processor 1371, a transmitter/receiver 1318 and an antenna 1320.

The UE 1350 comprises a controller/processor 1359, a memory 1360, a data source 1367, a transmitting processor 1368, a receiving processor 1356, a multi-antenna transmitting processor 1357, a multi-antenna receiving processor 1358, a transmitter/receiver 1354 and an antenna 1352.

In downlink (DL) transmission, at the gNB 1310, a higher-layer packet from a core network is provided to the controller/processor 1375. The controller/processor 1375 provides a functionality of the L2 layer. In DL transmission, the controller/processor 1375 provides header compression, encryption, packet segmentation and reordering, and multiplexing between a logical channel and a transport channel, and radio resource allocation for the UE 1350 based on various priorities. The controller/processor 1375 is also in charge of HARQ operation, retransmission of a lost packet, and a signaling to the UE 1350. The transmitting processor 1316 and the multi-antenna transmitting processor 1371 perform signal processing functions used for the L1 layer (that is, PHY). The transmitting processor 1316 performs coding and interleaving so as to ensure an FEC (Forward Error Correction) at the UE 1350 side and implements the mapping to signal clusters corresponding to each modulation scheme (i.e., BPSK, QPSK, M-PSK, M-QAM, etc.). The multi-antenna transmitting processor 1371 performs digital spatial precoding/beamforming on encoded and modulated symbols to generate one or more spatial streams. The transmitting processor 1316 then maps each spatial stream into a subcarrier. The mapped symbols are multiplexed with a reference signal (i.e., pilot frequency) in time domain and/or frequency domain, and then they are assembled through Inverse Fast Fourier Transform (IFFT) to generate a physical channel carrying time-domain multi-carrier symbol streams. After that the multi-antenna transmitting processor 1371 performs transmission analog precoding/beamforming operation on the time-domain multi-carrier symbol streams. Each transmitter 1318 converts a baseband multi-carrier symbol stream provided by the multi-antenna transmitting processor 1371 into a radio frequency (RF) stream, which is later provided to different antennas 420.

In downlink (DL) transmission, at the UE 1350, each receiver 1354 receives a signal via a corresponding antenna 1352. Each receiver 1354 recovers information modulated to the RF carrier, converts the radio frequency stream into a baseband multicarrier symbol stream to be provided to the receiving processor 1356. The receiving processor 1356 and the multi-antenna receiving processor 1358 perform signal processing functions of the L1 layer. The multi-antenna receiving processor 1358 perform reception analog precoding/beamforming operation on the baseband multicarrier symbol stream provided by the receiver 1354. The receiving processor 1356 converts the baseband multicarrier symbol stream from time domain into frequency domain using FFT. In frequency domain, a physical layer data signal and a reference signal are de-multiplexed by the receiving processor 1356, wherein a reference signal is used for channel estimation, while physical layer data is subjected to multi-antenna detection in the multi-antenna receiving processor 1358 to recover any UE 1350-targeted spatial stream. Symbols on each spatial stream are demodulated and recovered in the receiving processor 1356 to generate a soft decision. Then the receiving processor 1356 decodes and de-interleaves the soft decision to recover the higher-layer data and control signal transmitted by the gNB 1310 on the physical channel. Next, the higher-layer data and control signal are provided to the controller/processor 1359. The controller/processor 1359 performs functions of the L2 layer. The controller/processor 1359 can be connected to a memory 1360 that stores program code and data. The memory 1360 can be called a computer readable medium. In DL transmission, the controller/processor 1359 provides demultiplexing between a transport channel and a logical channel, packet reassembling, decryption, header decompression and control signal processing so as to recover a higher-layer packet from the core network. The higher-layer packet is later provided to all protocol layers above the L2 layer, or various control signals can be provided to the L3 layer for processing. The controller/processor 1359 also performs error detection using ACK and/or NACK protocols as a way to support HARQ operation.

In uplink (UL) transmission, at the UE 1350, the data source 1367 is configured to provide a higher-layer packet to the controller/processor 1359. The data source 1367 represents all protocol layers above the L2 layer. Similar to a transmitting function of the gNB 1310 described in DL transmission, the controller/processor 1359 performs header compression, encryption, packet segmentation and reordering, and multiplexing between a logical channel and a transport channel based on radio resource allocation of the gNB 1310 so as to provide the L2 layer functions used for the user plane and the control plane. The controller/processor 1359 is also responsible for HARQ operation, retransmission of a lost packet, and a signaling to the gNB 1310. The transmitting processor 1368 performs modulation mapping and channel coding, and the multi-antenna transmitting processor 1357 performs digital multi-antenna spatial precoding/beamforming. The generated spatial streams are modulated into multicarrier/single-carrier symbol streams by the transmitting processor 1368, and then modulated symbol streams are subjected to analog precoding/beamforming in the multi-antenna transmitting processor 1357 and are provided from the transmitters 1354 to each antenna 1352. Each transmitter 1354 first converts a baseband symbol stream provided by the multi-antenna transmitting processor 1357 into a radio frequency symbol stream, and then provides the radio frequency symbol stream to the antenna 1352.

In uplink (UL) transmission, the function of the gNB 1310 is similar to the receiving function of the UE 1350 described in DL transmission. Each receiver 1318 receives a radio frequency signal via a corresponding antenna 1320, converts the received radio frequency signal into a baseband signal, and provides the baseband signal to the multi-antenna receiving processor 1372 and the receiving processor 1370. The receiving processor 1370 and the multi-antenna receiving processor 1372 jointly provide functions of the L1 layer. The controller/processor 1375 provides functions of the L2 layer. The controller/processor 1375 can be connected with the memory 1376 that stores program code and data. The memory 1376 can be called a computer readable medium. In UL transmission, the controller/processor 1375 provides de-multiplexing between a transport channel and a logical channel, packet reassembling, decryption, header decompression, control signal processing so as to recover a higher-layer packet from the UE 1350. The higher-layer packet coming from the controller/processor 1375 may be provided to the core network. The controller/processor 1375 can also perform error detection using ACK and/or NACK protocols to support HARQ operation.

In one embodiment, the UE 1350 comprises at least one processor and at least one memory. The at least one memory includes computer program codes. The at least one memory and the computer program codes are configured to be used in collaboration with the at least one processor. The UE 1350 at least receives the L reference signal groups in the present disclosure; receives the R first signaling(s) in the present disclosure; and transmits the first radio signal in the present disclosure.

In one embodiment, the UE 1350 comprises a memory that stores a computer readable instruction program. The computer readable instruction program generates an action when executed by at least one processor. The action includes: receiving the L reference signal groups in the present disclosure; receiving the R first signaling(s) in the present disclosure; and transmitting the first radio signal in the present disclosure.

In one embodiment, the gNB 1310 comprises at least one processor and at least one memory. The at least one memory includes computer program codes. The at least one memory and the computer program codes are configured to be used in collaboration with the at least one processor. The gNB 1310 at least transmits the L reference signal groups in the present disclosure; transmits the R first signaling(s) in the present disclosure; and receives the first radio signal in the present disclosure.

In one embodiment, the gNB 1310 comprises a memory that stores a computer readable instruction program. The computer readable instruction program generates an action when executed by at least one processor. The action includes: transmitting the L reference signal groups in the present disclosure; transmitting the R first signaling(s) in the present disclosure; and receiving the first radio signal in the present disclosure.

In one embodiment, the UE 1350 corresponds to the UE in the present disclosure.

In one embodiment, the gNB 1310 corresponds to the base station in the present disclosure.

In one embodiment, at least one of the antenna 1352, the receiver 1354, the receiving processor 1356, the multi-antenna receiving processor 1358, or the controller/processor 1359 is used for receiving the L reference signal groups; at least one of the antenna 1320, the transmitter 1318, the transmitting processor 1316, the multi-antenna transmitting processor 1371, or the controller/processor 1375 is used for transmitting the L reference signal groups.

In one embodiment, at least one of the antenna 1352, the receiver 1354, the receiving processor 1356, the multi-antenna receiving processor 1358, or the controller/processor 1359 is used for receiving the R first signaling(s); at least one of the antenna 1320, the transmitter 1318, the transmitting processor 1316, the multi-antenna transmitting processor 1371, or the controller/processor 1375 is used for transmitting the R first signaling(s).

In one embodiment, at least one of antenna 1320, the receiver 1318, the receiving processor 1370, the multi-antenna receiving processor 1372, or the controller/processor 1375 is used for receiving the first radio signal; at least one of the antenna 1352, the transmitter 1354, the transmitting processor 1368, the multi-antenna transmitting processor 1357, or the controller/processor 1359 is used for transmitting the first radio signal.

In one embodiment, at least one of the antenna 1352, the receiver 1354, the receiving processor 1356, the multi-antenna receiving processor 1358, or the controller/processor 1359 is used for receiving Q second signaling(s); at least one of the antenna 1320, the transmitter 1318, the transmitting processor 1316, the multi-antenna transmitting processor 1371, or the controller/processor 1375 is used for transmitting Q second signaling(s).

In one embodiment, at least one of the antenna 1352, the receiver 1354, the receiving processor 1356, the multi-antenna receiving processor 1358, or the controller/processor 1359 is used for receiving the first downlink signaling; at least one of the antenna 1320, the transmitter 1318, the transmitting processor 1316, the multi-antenna transmitting processor 1371, or the controller/processor 1375 is used for transmitting the first downlink signaling.

In one embodiment, at least one of the antenna 1352, the receiver 1354, the receiving processor 1356, the multi-antenna receiving processor 1358, or the controller/processor 1359 is used for receiving the second downlink signaling; at least one of the antenna 1320, the transmitter 1318, the transmitting processor 1316, the multi-antenna transmitting processor 1371, or the controller/processor 1375 is used fo transmitting the second downlink signaling.

In one embodiment, the first receiver 201 in Embodiment 8 comprises at least one of an antenna 1352, a receiver 1354, a receiving processor 1356, a multi-antenna receiving processor 1358, a controller/processor 1359, a memory 1360, or a data source 1367.

In one embodiment, the second receiver 202 in Embodiment 8 comprises at least one of an antenna 1352, a receiver 1354, a receiving processor 1356, a multi-antenna receiving processor 1358, a controller/processor 1359, a memory 1360, or a data source 1367.

In one embodiment, the first transmitter 203 in Embodiment 8 comprises at least one of an antenna 1352, a transmitter 1354, a transmitting processor 1368, a multi-antenna transmitting processor 1357, a controller/processor 1359, a memory 1360, or a data source 1367.

In one embodiment, the second transmitter 301 in Embodiment 9 comprises at least one of an antenna 1320, a transmitter 1318, a transmitting processor 1316, a multi-antenna transmitting processor 1371, a controller/processor 1375, or a memory 1376.

In one embodiment, the third transmitter 302 in Embodiment 9 comprises at least one of an antenna 1320, a transmitter 1318, a transmitting processor 1316, a multi-antenna transmitting processor 1371, a controller/processor 1375, or a memory 1376.

In one embodiment, the third receiver 303 in Embodiment 9 comprises at least one of an antenna 1320, a receiver 1318, a receiving processor 1370, a multi-antenna receiving processor 1372, a controller/processor 1375, or a memory 1376.

The ordinary skill in the art may understand that all or part of steps in the above method may be implemented by instructing related hardware through a program. The program may be stored in a computer readable storage medium, for example Read-Only-Memory (ROM), hard disk or compact disc, etc. Optionally, all or part of steps in the above embodiments also may be implemented by one or more integrated circuits. Correspondingly, each module unit in the above embodiment may be implemented in the form of hardware, or in the form of software function modules. The present disclosure is not limited to any combination of hardware and software in specific forms. The UE or terminal in the present disclosure includes but is not limited to unmanned aerial vehicles, communication modules on unmanned aerial vehicles, telecontrolled aircrafts, aircrafts, diminutive airplanes, mobile phones, tablet computers, notebooks, vehicle-mounted communication equipment, wireless sensor, network cards, communication modules for Internet of Things (TOT), terminals for TOT, RFID terminals, NB-TOT terminals, Machine Type Communication (MTC) terminals, enhanced MTC (eMTC) terminals, data cards, low-cost mobile phones, low-cost tablet computers, etc. The base station or system device in the present disclosure includes but is not limited to macro-cellular base stations, micro-cellular base stations, home base stations, relay base station, gNB (NR node B), Transmitter Receiver Point (TRP), and other radio communication equipment.

The above are merely the preferred embodiments of the present disclosure and are not intended to limit the scope of protection of the present disclosure. Any modification, equivalent substitute and improvement made within the spirit and principle of the present disclosure are intended to be included within the scope of protection of the present disclosure.

What is claimed is:

1. A method in a User Equipment (UE) for power adjustment, comprising:
   receiving L reference signal groups;
   receiving R first signaling(s); and
   transmitting a first radio signal;
   wherein the L reference signal groups are transmitted by L antenna port sets respectively, the R first signaling(s) is (are) used for determining R first offset(s), the first radio signal comprises a first report, the first report is used for determining K difference value(s), the K difference value(s) respectively corresponds(correspond) to K first reference power value(s); each of the K first reference power value(s) is linearly correlated to a sum of the R first offset(s); measurement(s) on K reference signal group(s) is (are) respectively used for determining the K first reference power value(s), the K reference signal group(s) is (are) a subset of the L reference signal groups; a transmitting power of the first radio signal is a first power; the first power is associated with a first reference signal group; the first reference signal group is one of the K reference signal group(s); the R first offset(s) is (are) used for determining the first power; an antenna port set comprises a positive integer number of antenna port(s); all antenna ports of the L antenna port sets are used for one same serving cell, or all antenna ports of the L antenna port sets are used for one same carrier; the L is a positive integer greater than 1, the K is a positive integer not greater than the L, the R is a positive integer.

2. The method according to claim 1, wherein the first report is triggered by a given condition; the given condition comprises at least one of the following:
   a change in an average of K pathloss value(s) is greater than a first threshold,
   a change in a first pathloss value of the K pathloss value(s) is greater than a second threshold, the first pathloss value is a pathloss value with a biggest change among the K pathloss value(s),
   a change in a second pathloss value of the K pathloss value(s) is greater than a third threshold, the second pathloss value is a pathloss value with a smallest change among the K pathloss value(s),
   a change in a reference pathloss value is greater than a fourth threshold, the reference pathloss value is linearly correlated to each of the K pathloss value(s) respectively,
   a first timer completes time counting,
   the UE receives a target signaling, the target signaling is used for triggering the first report,
   herein, the K pathloss value(s) is (are) respectively determined by the measurement(s) on the K reference signal group(s);
   or, further comprising:
   receiving a first downlink signaling, and
   receiving a second downlink signaling,
   the first report is triggered by a given condition; the given condition comprises at least one of the following:
   a change in an average of K pathloss value(s) is greater than a first threshold,
   a change in a first pathloss value of the K pathloss value(s) is greater than a second threshold, the first pathloss value is a pathloss value with a biggest change among the K pathloss value(s),
   a change in a second pathloss value of the K pathloss value(s) is greater than a third threshold, the second pathloss value is a pathloss value with a smallest change among the K pathloss value(s),
   a change in a reference pathloss value is greater than a fourth threshold, the reference pathloss value is linearly correlated to each of the K pathloss value(s) respectively,
   a first timer completes time counting,
   the UE receives a target signaling, the target signaling is used for triggering the first report,
   herein, the K pathloss value(s) is (are) respectively determined by the measurement(s) on the K reference signal group(s), the first downlink signaling indicates a time length of the first timer, the second downlink signaling is used for determining at least one of the first threshold, the second threshold, the third threshold or the fourth threshold;
   or, a target first signaling is a latest first signaling among the R first signaling(s), the target first signaling comprises scheduling information of the first radio signal, the scheduling information of the first radio signal comprises at least one of time domain resources occupied, frequency domain resources occupied, an MCS, a HARQ process number, a Redundancy Version (RV) or a New Data Indicator (NDI).

3. The method according to claim 1, further comprising:
   receiving Q second signaling(s);
   wherein the Q second signaling(s) is (are) respectively used for determining Q second offset(s), the K difference value(s) corresponds(correspond) to K second reference power value(s) respectively, each of the K second reference power value(s) is linearly correlated to a sum of the Q second offset(s), the measurement(s) on the K reference signal group(s) is (are) respectively used for determining the K second reference power value(s); the Q is a positive integer.

4. The method according to claim 1, wherein the K difference value(s) corresponds(correspond) to K reference power value(s) respectively, a given reference power value is any reference power value of the K reference power value(s), the given reference power value is equal to a corresponding first reference power value;
   or, the K difference value(s) corresponds(correspond) to K reference power value(s) respectively, a given reference power value is any reference power value of the K reference power value(s), the given reference power value is equal to a corresponding first reference power value, the K difference value(s) is (are) difference(s) between a first limiting power value and corresponding reference power value(s);
   or, the K difference value(s) corresponds(correspond) to K reference power value(s) respectively, a given reference power value is any reference power value of the K reference power value(s), the given reference power value is equal to a corresponding first reference power value, a first difference value is a difference between a second limiting power value and a corresponding reference power value, the first difference value is one difference value of the K difference value(s), difference value(s) other than the first difference value in the K difference value(s) is (are) equal to difference(s) between a first limiting power value and corresponding reference power value(s) respectively;
   or, the K difference value(s) corresponds(correspond) to K reference power value(s) respectively, a given reference power value is any reference power value of the K reference power value(s), the given reference power value is equal to a corresponding first reference power value, the K difference value(s) corresponds(correspond) to K target power value(s) respectively, the K difference value(s) is (are) respectively equal to difference(s) between corresponding target power value(s) and corresponding reference power value(s).

5. The method according to claim 3, wherein the K difference value(s) corresponds(correspond) to K reference power value(s) respectively, a given reference power value is any reference power value of the K reference power value(s), the given reference power value is determined by a corresponding first reference power value and a corresponding second reference power value;
   or, the K difference value(s) corresponds(correspond) to K reference power value(s) respectively, a given reference power value is any reference power value of the K reference power value(s), the given reference power value is determined by a corresponding first reference power value and a corresponding second reference power value, the K difference value(s) is (are) difference(s) between a first limiting power value and corresponding reference power value(s);

or, the K difference value(s) corresponds(correspond) to K reference power value(s) respectively, a given reference power value is any reference power value of the K reference power value(s), the given reference power value is determined by a corresponding first reference power value and a corresponding second reference power value, a first difference value is a difference between a second limiting power value and a corresponding reference power value, the first difference value is one difference value of the K difference value(s), difference value(s) other than the first difference value in the K difference value(s) is (are) equal to difference(s) between a first limiting power value and corresponding reference power value(s) respectively;

or, the K difference value(s) corresponds(correspond) to K reference power value(s) respectively, a given reference power value is any reference power value of the K reference power value(s), the given reference power value is determined by a corresponding first reference power value and a corresponding second reference power value, the K difference value(s) corresponds (correspond) to K target power value(s) respectively, the K difference value(s) is (are) respectively equal to difference(s) between corresponding target power value(s) and corresponding reference power value(s).

6. A method in a base station for power adjustment, comprising:
transmitting L reference signal groups;
transmitting R first signaling(s); and
receiving a first radio signal;
wherein the L reference signal groups are transmitted by L antenna port sets respectively, the R first signaling(s) is (are) used for determining R first offset(s), the first radio signal comprises a first report, the first report is used for determining K difference value(s), the K difference value(s) respectively corresponds(correspond) to K first reference power value(s); each of the K first reference power value(s) is linearly correlated to a sum of the R first offset(s); measurement(s) on K reference signal group(s) is (are) respectively used for determining the K first reference power value(s), the K reference signal group(s) is (are) a subset of the L reference signal groups; a transmitting power of the first radio signal is a first power; the first power is associated with a first reference signal group; the first reference signal group is one of the K reference signal group(s); the R first offset(s) is (are) used for determining the first power; an antenna port set comprises a positive integer number of antenna port(s); all antenna ports of the L antenna port sets are used for one same serving cell, or all antenna ports of the L antenna port sets are used for one same carrier; the L is a positive integer greater than 1, the K is a positive integer not greater than the L, the R is a positive integer.

7. The method according to claim 6, wherein the first report is triggered by a given condition; the given condition comprises at least one of the following:
a change in an average of K pathloss value(s) is greater than a first threshold,
a change in a first pathloss value of the K pathloss value(s) is greater than a second threshold, the first pathloss value is a pathloss value with a biggest change among the K pathloss value(s),
a change in a second pathloss value of the K pathloss value(s) is greater than a third threshold, the second pathloss value is a pathloss value with a smallest change among the K pathloss value(s),
a change in a reference pathloss value is greater than a fourth threshold, the reference pathloss value is linearly correlated to each of the K pathloss value(s) respectively,
a first timer completes time counting,
the UE receives a target signaling, the target signaling is used for triggering the first report,
herein, the K pathloss value(s) is (are) respectively determined by the measurement(s) on the K reference signal group(s);

or, further comprising:
transmitting a first downlink signaling, and
transmitting a second downlink signaling,
the first report is triggered by a given condition; the given condition comprises at least one of the following:
a change in an average of K pathloss value(s) is greater than a first threshold,
a change in a first pathloss value of the K pathloss value(s) is greater than a second threshold, the first pathloss value is a pathloss value with a biggest change among the K pathloss value(s),
a change in a second pathloss value of the K pathloss value(s) is greater than a third threshold, the second pathloss value is a pathloss value with a smallest change among the K pathloss value(s),
a change in a reference pathloss value is greater than a fourth threshold, the reference pathloss value is linearly correlated to each of the K pathloss value(s) respectively,
a first timer completes time counting,
the UE receives a target signaling, the target signaling is used for triggering the first report,
herein, the K pathloss value(s) is (are) respectively determined by the measurement(s) on the K reference signal group(s), the first downlink signaling indicates a time length of the first timer, the second downlink signaling is used for determining at least one of the first threshold, the second threshold, the third threshold or the fourth threshold;

or, a target first signaling is a latest first signaling among the R first signaling(s), the target first signaling comprises scheduling information of the first radio signal, the scheduling information of the first radio signal comprises at least one of time domain resources occupied, frequency domain resources occupied, an MCS, a HARQ process number, an RV or an NDI.

8. The method according to claim 6, further comprising:
transmitting Q second signaling(s);
wherein the Q second signaling(s) is (are) respectively used for determining Q second offset(s), the K difference value(s) corresponds(correspond) to K second reference power value(s) respectively, each of the K second reference power value(s) is linearly correlated to a sum of the Q second offset(s), the measurement(s) on the K reference signal group(s) is (are) respectively used for determining the K second reference power value(s); the Q is a positive integer.

9. The method according to claim 6, wherein the K difference value(s) corresponds(correspond) to K reference power value(s) respectively, a given reference power value is any reference power value of the K reference power value(s), the given reference power value is equal to a corresponding first reference power value;

or, the K difference value(s) corresponds(correspond) to K reference power value(s) respectively, a given reference power value is any reference power value of the K reference power value(s), the given reference power value is equal to a corresponding first reference power value, the K difference value(s) is (are) difference(s) between a first limiting power value and corresponding reference power value(s);

or, the K difference value(s) corresponds(correspond) to K reference power value(s) respectively, a given reference power value is any reference power value of the K reference power value(s), the given reference power value is equal to a corresponding first reference power value, a first difference value is a difference between a second limiting power value and a corresponding reference power value, the first difference value is one difference value of the K difference value(s), difference value(s) other than the first difference value in the K difference value(s) is (are) equal to difference(s) between a first limiting power value and corresponding reference power value(s) respectively;

or, the K difference value(s) corresponds(correspond) to K reference power value(s) respectively, a given reference power value is any reference power value of the K reference power value(s), the given reference power value is equal to a corresponding first reference power value, the K difference value(s) corresponds(correspond) to K target power value(s) respectively, the K difference value(s) is (are) respectively equal to difference(s) between corresponding target power value(s) and corresponding reference power value(s).

10. The method according to claim 8, wherein the K difference value(s) corresponds(correspond) to K reference power value(s) respectively, a given reference power value is any reference power value of the K reference power value(s), the given reference power value is determined by a corresponding first reference power value and a corresponding second reference power value;

or, the K difference value(s) corresponds(correspond) to K reference power value(s) respectively, a given reference power value is any reference power value of the K reference power value(s), the given reference power value is determined by a corresponding first reference power value and a corresponding second reference power value, the K difference value(s) is (are) difference(s) between a first limiting power value and corresponding reference power value(s);

or, the K difference value(s) corresponds(correspond) to K reference power value(s) respectively, a given reference power value is any reference power value of the K reference power value(s), the given reference power value is determined by a corresponding first reference power value and a corresponding second reference power value, a first difference value is a difference between a second limiting power value and a corresponding reference power value, the first difference value is one difference value of the K difference value(s), difference value(s) other than the first difference value in the K difference value(s) is (are) equal to difference(s) between a first limiting power value and corresponding reference power value(s) respectively;

or, the K difference value(s) corresponds(correspond) to K reference power value(s) respectively, a given reference power value is any reference power value of the K reference power value(s), the given reference power value is determined by a corresponding first reference power value and a corresponding second reference power value, the K difference value(s) corresponds (correspond) to K target power value(s) respectively, the K difference value(s) is (are) respectively equal to difference(s) between corresponding target power value(s) and corresponding reference power value(s).

11. A UE for power adjustment, comprising:
a first receiver, receiving L reference signal groups;
a second receiver, receiving R first signaling(s); and
a first transmitter, transmitting a first radio signal;
wherein the L reference signal groups are transmitted by L antenna port sets respectively, the R first signaling(s) is (are) used for determining R first offset(s), the first radio signal comprises a first report, the first report is used for determining K difference value(s), the K difference value(s) respectively corresponds(correspond) to K first reference power value(s); each of the K first reference power value(s) is linearly correlated to a sum of the R first offset(s); measurement(s) on K reference signal group(s) is (are) respectively used for determining the K first reference power value(s), the K reference signal group(s) is (are) a subset of the L reference signal groups; a transmitting power of the first radio signal is a first power; the first power is associated with a first reference signal group; the first reference signal group is one of the K reference signal group(s); the R first offset(s) is (are) used for determining the first power; an antenna port set comprises a positive integer number of antenna port(s); all antenna ports of the L antenna port sets are used for one same serving cell, or all antenna ports of the L antenna port sets are used for one same carrier; the L is a positive integer greater than 1, the K is a positive integer not greater than the L, the R is a positive integer.

12. The UE according to claim 11, wherein the first report is triggered by a given condition; the given condition comprises at least one of the following:
a change in an average of K pathloss value(s) is greater than a first threshold,
a change in a first pathloss value of the K pathloss value(s) is greater than a second threshold, the first pathloss value is a pathloss value with a biggest change among the K pathloss value(s),
a change in a second pathloss value of the K pathloss value(s) is greater than a third threshold, the second pathloss value is a pathloss value with a smallest change among the K pathloss value(s),
a change in a reference pathloss value is greater than a fourth threshold, the reference pathloss value is linearly correlated to each of the K pathloss value(s) respectively,
a first timer completes time counting,
the UE receives a target signaling, the target signaling is used for triggering the first report,
herein, the K pathloss value(s) is (are) respectively determined by the measurement(s) on the K reference signal group(s);
or, the first receiver receives a first downlink signaling and a second downlink signaling, the first report is triggered by a given condition; the given condition comprises at least one of the following:
a change in an average of K pathloss value(s) is greater than a first threshold,
a change in a first pathloss value of the K pathloss value(s) is greater than a second threshold, the first pathloss value is a pathloss value with a biggest change among the K pathloss value(s),
a change in a second pathloss value of the K pathloss value(s) is greater than a third threshold, the second pathloss value is a pathloss value with a smallest change among the K pathloss value(s), a change in a reference pathloss value is greater than a fourth threshold, the reference pathloss value is linearly correlated to each of the K pathloss value(s) respectively, a first timer completes time counting, the UE receives a target signaling, the target signaling is used for triggering the first report, herein, the K pathloss value(s) is (are) respectively determined by the measurement(s) on the K reference signal group(s), the first downlink signaling indicates a time length of the first timer, the second downlink signaling is used for determining at least one of the first threshold, the second threshold, the third threshold or the fourth threshold;

or, a target first signaling is a latest first signaling among the R first signaling(s), the target first signaling comprises scheduling information of the first radio signal, the scheduling information of the first radio signal comprises at least one of time domain resources occupied, frequency domain resources occupied, an MCS, a HARQ process number, an RV or an NDI.

13. The UE according to claim 11, wherein the second receiver receives Q second signaling(s); wherein the Q second signaling(s) is (are) respectively used for determining Q second offset(s), the K difference value(s) corresponds(correspond) to K second reference power value(s) respectively, each of the K second reference power value(s) is linearly correlated to a sum of the Q second offset(s), the measurement(s) on the K reference signal group(s) is (are) respectively used for determining the K second reference power value(s); the Q is a positive integer.

14. The UE according to claim 11, wherein the K difference value(s) corresponds(correspond) to K reference power value(s) respectively, a given reference power value is any reference power value of the K reference power value(s), the given reference power value is equal to a corresponding first reference power value;

or, the K difference value(s) corresponds(correspond) to K reference power value(s) respectively, a given reference power value is any reference power value of the K reference power value(s), the given reference power value is equal to a corresponding first reference power value, the K difference value(s) is (are) difference(s) between a first limiting power value and corresponding reference power value(s);

or, the K difference value(s) corresponds(correspond) to K reference power value(s) respectively, a given reference power value is any reference power value of the K reference power value(s), the given reference power value is equal to a corresponding first reference power value, a first difference value is a difference between a second limiting power value and a corresponding reference power value, the first difference value is one difference value of the K difference value(s), difference value(s) other than the first difference value in the K difference value(s) is (are) equal to difference(s) between a first limiting power value and corresponding reference power value(s) respectively;

or, the K difference value(s) corresponds(correspond) to K reference power value(s) respectively, a given reference power value is any reference power value of the K reference power value(s), the given reference power value is equal to a corresponding first reference power value, the K difference value(s) corresponds(correspond) to K target power value(s) respectively, the K difference value(s) is (are) respectively equal to difference(s) between corresponding target power value(s) and corresponding reference power value(s).

15. The UE according to claim 13, wherein the K difference value(s) corresponds(correspond) to K reference power value(s) respectively, a given reference power value is any reference power value of the K reference power value(s), the given reference power value is determined by a corresponding first reference power value and a corresponding second reference power value;

or, the K difference value(s) corresponds(correspond) to K reference power value(s) respectively, a given reference power value is any reference power value of the K reference power value(s), the given reference power value is determined by a corresponding first reference power value and a corresponding second reference power value, the K difference value(s) is (are) difference(s) between a first limiting power value and corresponding reference power value(s);

or, the K difference value(s) corresponds(correspond) to K reference power value(s) respectively, a given reference power value is any reference power value of the K reference power value(s), the given reference power value is determined by a corresponding first reference power value and a corresponding second reference power value, a first difference value is a difference between a second limiting power value and a corresponding reference power value, the first difference value is one difference value of the K difference value(s), difference value(s) other than the first difference value in the K difference value(s) is (are) equal to difference(s) between a first limiting power value and corresponding reference power value(s) respectively;

or, the K difference value(s) corresponds(correspond) to K reference power value(s) respectively, a given reference power value is any reference power value of the K reference power value(s), the given reference power value is determined by a corresponding first reference power value and a corresponding second reference power value, the K difference value(s) corresponds(correspond) to K target power value(s) respectively, the K difference value(s) is (are) respectively equal to difference(s) between corresponding target power value(s) and corresponding reference power value(s).

16. A base station for power adjustment, comprising:

a second transmitter, transmitting L reference signal groups;

a third transmitter, transmitting R first signaling(s); and a third receiver, receiving a first radio signal;

wherein the L reference signal groups are transmitted by L antenna port sets respectively, the R first signaling(s) is (are) used for determining R first offset(s), the first radio signal comprises a first report, the first report is used for determining K difference value(s), the K difference value(s) respectively corresponds(correspond) to K first reference power value(s); each of the K first reference power value(s) is linearly correlated to a sum of the R first offset(s); measurement(s) on K reference signal group(s) is (are) respectively used for determining the K first reference power value(s), the K reference signal group(s) is (are) a subset of the L reference signal groups; a transmitting power of the first radio signal is a first power; the first power is associated with a first reference signal group; the first reference signal group is one of the K reference signal group(s); the R first offset(s) is (are) used for determining the first power; an antenna port set comprises a positive integer number of antenna port(s); all antenna ports of the L antenna port sets are used for one same serving cell, or all antenna ports of the L antenna port sets are used for one same carrier; the L is a positive integer greater than 1, the K is a positive integer not greater than the L, the R is a positive integer.

17. The base station according to claim 16, wherein the first report is triggered by a given condition; the given condition comprises at least one of the following:
a change in an average of K pathloss value(s) is greater than a first threshold,
a change in a first pathloss value of the K pathloss value(s) is greater than a second threshold, the first pathloss value is a pathloss value with a biggest change among the K pathloss value(s),
a change in a second pathloss value of the K pathloss value(s) is greater than a third threshold, the second pathloss value is a pathloss value with a smallest change among the K pathloss value(s),
a change in a reference pathloss value is greater than a fourth threshold, the reference pathloss value is linearly correlated to each of the K pathloss value(s) respectively,
a first timer completes time counting,
the UE receives a target signaling, the target signaling is used for triggering the first report,
herein, the K pathloss value(s) is (are) respectively determined by the measurement(s) on the K reference signal group(s);
or, the second transmitter transmits a first downlink signaling and a second downlink signaling, the first report is triggered by a given condition; the given condition comprises at least one of the following:
a change in an average of K pathloss value(s) is greater than a first threshold,
a change in a first pathloss value of the K pathloss value(s) is greater than a second threshold, the first pathloss value is a pathloss value with a biggest change among the K pathloss value(s),
a change in a second pathloss value of the K pathloss value(s) is greater than a third threshold, the second pathloss value is a pathloss value with a smallest change among the K pathloss value(s),
a change in a reference pathloss value is greater than a fourth threshold, the reference pathloss value is linearly correlated to each of the K pathloss value(s) respectively,
a first timer completes time counting,
the UE receives a target signaling, the target signaling is used for triggering the first report,
herein, the K pathloss value(s) is (are) respectively determined by the measurement(s) on the K reference signal group(s), the first downlink signaling indicates a time length of the first timer, the second downlink signaling is used for determining at least one of the first threshold, the second threshold, the third threshold or the fourth threshold;
or, a target first signaling is a latest first signaling among the R first signaling(s), the target first signaling comprises scheduling information of the first radio signal, the scheduling information of the first radio signal comprises at least one of time domain resources occupied, frequency domain resources occupied, an MCS, a HARQ process number, an RV or an NDI.

18. The base station according to claim 16, wherein the third transmitter transmits Q second signaling(s); wherein the second receiver receives Q second signaling(s); wherein the Q second signaling(s) is (are) respectively used for determining Q second offset(s), the K difference value(s) corresponds(correspond) to K second reference power value(s) respectively, each of the K second reference power value(s) is linearly correlated to a sum of the Q second offset(s), the measurement(s) on the K reference signal group(s) is (are) respectively used for determining the K second reference power value(s); the Q is a positive integer.

19. The base station according to claim 16, wherein the K difference value(s) corresponds(correspond) to K reference power value(s) respectively, a given reference power value is any reference power value of the K reference power value(s), the given reference power value is equal to a corresponding first reference power value;
or, the K difference value(s) corresponds(correspond) to K reference power value(s) respectively, a given reference power value is any reference power value of the K reference power value(s), the given reference power value is equal to a corresponding first reference power value, the K difference value(s) is (are) difference(s) between a first limiting power value and corresponding reference power value(s);
or, the K difference value(s) corresponds(correspond) to K reference power value(s) respectively, a given reference power value is any reference power value of the K reference power value(s), the given reference power value is equal to a corresponding first reference power value, a first difference value is a difference between a second limiting power value and a corresponding reference power value, the first difference value is one difference value of the K difference value(s), difference value(s) other than the first difference value in the K difference value(s) is (are) equal to difference(s) between a first limiting power value and corresponding reference power value(s) respectively;
or, the K difference value(s) corresponds(correspond) to K reference power value(s) respectively, a given reference power value is any reference power value of the K reference power value(s), the given reference power value is equal to a corresponding first reference power value, the K difference value(s) corresponds(correspond) to K target power value(s) respectively, the K difference value(s) is (are) respectively equal to difference(s) between corresponding target power value(s) and corresponding reference power value(s).

20. The base station according to claim 18, wherein the K difference value(s) corresponds(correspond) to K reference power value(s) respectively, a given reference power value is any reference power value of the K reference power value(s), the given reference power value is determined by a corresponding first reference power value and a corresponding second reference power value;
or, the K difference value(s) corresponds(correspond) to K reference power value(s) respectively, a given reference power value is any reference power value of the K reference power value(s), the given reference power value is determined by a corresponding first reference power value and a corresponding second reference power value, the K difference value(s) is (are) difference(s) between a first limiting power value and corresponding reference power value(s);
or, the K difference value(s) corresponds(correspond) to K reference power value(s) respectively, a given reference power value is any reference power value of the K reference power value(s), the given reference power value is determined by a corresponding first reference power value and a corresponding second reference power value, a first difference value is a difference between a second limiting power value and a corresponding reference power value, the first difference value is one difference value of the K difference value(s), difference value(s) other than the first difference value in the K difference value(s) is (are) equal to difference(s) between a first limiting power value and corresponding reference power value(s) respectively;

or, the K difference value(s) corresponds(correspond) to K reference power value(s) respectively, a given reference power value is any reference power value of the K reference power value(s), the given reference power value is determined by a corresponding first reference power value and a corresponding second reference power value, the K difference value(s) corresponds (correspond) to K target power value(s) respectively, the K difference value(s) is (are) respectively equal to difference(s) between corresponding target power value(s) and corresponding reference power value(s).

* * * * *